US012245266B2

(12) United States Patent
Nguyen et al.

(10) Patent No.: US 12,245,266 B2
(45) Date of Patent: Mar. 4, 2025

(54) PRIORITIZATION BETWEEN FEEDBACK AND COLLISION INDICATIONS

(71) Applicant: QUALCOMM Incorporated, San Diego, CA (US)

(72) Inventors: Tien Viet Nguyen, Bridgewater, NJ (US); Gabi Sarkis, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/727,661

(22) Filed: Apr. 22, 2022

(65) Prior Publication Data

US 2023/0345519 A1   Oct. 26, 2023

(51) Int. Cl.
*H04W 72/56*    (2023.01)
*H04W 74/0808*  (2024.01)

(52) U.S. Cl.
CPC ....... *H04W 72/56* (2023.01); *H04W 74/0825* (2013.01)

(58) Field of Classification Search
CPC .......................... H04W 72/56; H04W 74/0825
See application file for complete search history.

(56) References Cited

U.S. PATENT DOCUMENTS

| | | | |
|---|---|---|---|
| 2020/0359394 A1* | 11/2020 | Wu | H04W 72/569 |
| 2022/0046628 A1* | 2/2022 | Ji | H04L 1/1896 |
| 2022/0240256 A1* | 7/2022 | Balasubramanian | H04W 52/243 |
| 2024/0292441 A1* | 8/2024 | Liu | H04W 72/563 |

* cited by examiner

*Primary Examiner* — Kashif Siddiqui
(74) *Attorney, Agent, or Firm* — Holland & Hart LLP

(57) ABSTRACT

Methods, systems, and devices for wireless communications are described. A first user equipment (UE) may identify feedback indications and collision indications to transmit to a second UE. A feedback indication may indicate whether sidelink data was received and decoded successfully by the first UE, and a collision indication may indicate an expected conflict between the second UE and a third UE. In one aspect, the first UE may generate a feedback message including both feedback indications and collision indications, and the first UE may prioritize the feedback message based on the feedback indications, the collision indications, or both. In another aspect, the first UE may avoid including collision indications in a same feedback message as feedback indications.

30 Claims, 12 Drawing Sheets

Location of SCI causing a conflict

Resource with the conflict

PRIORITIZATION BETWEEN FEEDBACK AND COLLISION INDICATIONS

FIELD OF TECHNOLOGY

The following relates to wireless communications, including prioritization between feedback and collision indications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). Some wireless communications systems may support sidelink communications between UEs. In such systems, it may be appropriate for UEs to exchange messages to coordinate communications on sidelink resources (e.g., to avoid interference and collisions). Such messages may be referred to as inter-UE coordination messages. Improved techniques for utilizing inter-UE coordination messages may be desirable.

SUMMARY

The described techniques relate to improved methods, systems, devices, and apparatuses that support prioritization between feedback and collision indications. A first user equipment (UE) may identify feedback indications and collision indications to transmit to a second UE. A feedback indication may indicate whether sidelink data was received and decoded successfully by the first UE, and a collision indication may indicate an expected conflict between the second UE and a third UE. In one aspect, the first UE may generate a feedback message including both feedback indications and collision indications, and the first UE may prioritize the feedback message based on the feedback indications, the collision indications, or both. In another aspect, the first UE may avoid including collision indications in a same feedback message as feedback indications.

A method for wireless communication at a first user equipment (UE) is described. The method may include assigning a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both, assigning a second priority to a second message based on a second prioritization rule, where the second message is scheduled on overlapping resources with the first sidelink feedback channel message, and communicating on the overlapping resources based on a comparison of the first priority of the first sidelink feedback channel message and the second priority of the second message.

An apparatus for wireless communication at a first UE is described. The apparatus may include a processor, memory coupled with the processor, and instructions stored in the memory. The instructions may be executable by the processor to cause the apparatus to assign a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both, assign a second priority to a second message based on a second prioritization rule, where the second message is scheduled on overlapping resources with the first sidelink feedback channel message, and communicate on the overlapping resources based on a comparison of the first priority of the first sidelink feedback channel message and the second priority of the second message.

Another apparatus for wireless communication at a first UE is described. The apparatus may include means for assigning a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both, means for assigning a second priority to a second message based on a second prioritization rule, where the second message is scheduled on overlapping resources with the first sidelink feedback channel message, and means for communicating on the overlapping resources based on a comparison of the first priority of the first sidelink feedback channel message and the second priority of the second message.

A non-transitory computer-readable medium storing code for wireless communication at a first UE is described. The code may include instructions executable by a processor to assign a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both, assign a second priority to a second message based on a second prioritization rule, where the second message is scheduled on overlapping resources with the first sidelink feedback channel message, and communicate on the overlapping resources based on a comparison of the first priority of the first sidelink feedback channel message and the second priority of the second message.

In some examples of the method, apparatuses, and non-transitory computer-readable medium described herein, assigning the first priority of the first message may include operations, features, means, or instructions for determining, according to a first prioritization procedure, a highest priority of the one or more first priorities of the one or more feedback indications, where the highest priority of the one or more first priorities of the one or more feedback indications corresponds to the first priority of the first sidelink feedback channel message.

In some examples of the method, apparatuses, and non-transitory computer-readable medium described herein, the first prioritization rule indicates using the first prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

In some examples of the method, apparatuses, and non-transitory computer-readable medium described herein, assigning the first priority of the first message may include operations, features, means, or instructions for determining, according to a second prioritization procedure, a highest priority of the one or more first priorities of the one or more feedback indications and of the one or more second priorities of the one or more collision indications, where the highest priority of the one or more first priorities of the one or more feedback indications and of the one or more second priorities of the one or more collision indications corresponds to the first priority of the first sidelink feedback channel message.

In some examples of the method, apparatuses, and non-transitory computer-readable medium described herein, the first prioritization rule indicates using the second prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

In some examples of the method, apparatuses, and non-transitory computer-readable medium described herein, the first prioritization rule indicates using a first prioritization procedure for communication prioritization between sidelink feedback channel messages for transmission and reception, and the first prioritization rule indicates using a second prioritization procedure for communication prioritization between a sidelink feedback channel message associated with a first radio access technology and another message associated with a second radio access technology or between a sidelink feedback channel message and an uplink message.

In some examples of the method, apparatuses, and non-transitory computer-readable medium described herein, the first prioritization procedure indicates using a highest priority of the one or more first priorities of the one or more feedback indications as the first priority, and the second prioritization procedure indicates using a highest priority of the one or more first priorities of the one or more feedback indications and of the one or more second priorities of the one or more collision indications as the first priority.

In some examples of the method, apparatuses, and non-transitory computer-readable medium described herein, communicating on the overlapping resources may include operations, features, means, or instructions for transmitting or receiving the first sidelink feedback channel message when the first priority of the first sidelink feedback channel message may be higher than the second priority of the second message.

In some examples of the method, apparatuses, and non-transitory computer-readable medium described herein, communicating on the overlapping resources may include operations, features, means, or instructions for transmitting or receiving the second message when the second priority of the second message may be higher than the first priority of the first sidelink feedback channel message.

Some examples of the method, apparatuses, and non-transitory computer-readable medium described herein may further include operations, features, means, or instructions for receiving sidelink data from a second UE and generating the first sidelink feedback channel message including the one or more feedback indications for transmission to the second UE based on receiving the sidelink data from the second UE, where the one or more feedback indications include hybrid automatic repeat request feedback for the sidelink data.

Some examples of the method, apparatuses, and non-transitory computer-readable medium described herein may further include operations, features, means, or instructions for transmitting sidelink data to a second UE and determining that the first sidelink feedback channel message includes the one or more feedback indications for reception by the first UE based on transmitting the sidelink data to the second UE, where the one or more feedback indications include hybrid automatic repeat request feedback for the sidelink data.

Some examples of the method, apparatuses, and non-transitory computer-readable medium described herein may further include operations, features, means, or instructions for receiving sidelink control information from a second UE reserving resources for sidelink communications, where the resources reserved by the second UE at least partially overlaps with resources reserved by a third UE and generating the first sidelink feedback channel message including the one or more collision indications for transmission to the second UE based on receiving the sidelink control information from the second UE, where each of the one or more collision indications indicates that the resources reserved by the second UE at least partially overlaps with the resources reserved by the third UE.

Some examples of the method, apparatuses, and non-transitory computer-readable medium described herein may further include operations, features, means, or instructions for transmitting sidelink control information reserving resources for sidelink communications and determining that the first sidelink feedback channel message includes the one or more collision indications for reception by the first UE based on transmitting the sidelink control information, where each of the one or more collision indications indicates that the resources reserved by the first UE at least partially overlaps with the resources reserved by a second UE.

A method for wireless communication at a first UE is described. The method may include generating a sidelink feedback channel message to transmit to a second UE, the sidelink feedback channel message including one or more feedback indications, avoiding including one or more collision indications for transmission to the second UE in the sidelink feedback channel message, determining a priority of the sidelink feedback channel message based on one or more priorities of the one or more feedback indications, and transmitting the sidelink feedback channel message based on the priority of the sidelink feedback channel message.

An apparatus for wireless communication at a first UE is described. The apparatus may include a processor, memory coupled with the processor, and instructions stored in the memory. The instructions may be executable by the processor to cause the apparatus to generate a sidelink feedback channel message to transmit to a second UE, the sidelink feedback channel message including one or more feedback indications, avoid including one or more collision indications for transmission to the second UE in the sidelink feedback channel message, determine a priority of the sidelink feedback channel message based on one or more priorities of the one or more feedback indications, and transmit the sidelink feedback channel message based on the priority of the sidelink feedback channel message.

Another apparatus for wireless communication at a first UE is described. The apparatus may include means for generating a sidelink feedback channel message to transmit to a second UE, the sidelink feedback channel message including one or more feedback indications, means for avoiding including one or more collision indications for transmission to the second UE in the sidelink feedback channel message, means for determining a priority of the sidelink feedback channel message based on one or more priorities of the one or more feedback indications, and means for transmitting the sidelink feedback channel message based on the priority of the sidelink feedback channel message.

A non-transitory computer-readable medium storing code for wireless communication at a first UE is described. The code may include instructions executable by a processor to generate a sidelink feedback channel message to transmit to a second UE, the sidelink feedback channel message including one or more feedback indications, avoid including one or more collision indications for transmission to the second UE in the sidelink feedback channel message, determine a priority of the sidelink feedback channel message based on one or more priorities of the one or more feedback indications, and transmit the sidelink feedback channel message based on the priority of the sidelink feedback channel message.

Some examples of the method, apparatuses, and non-transitory computer-readable medium described herein may further include operations, features, means, or instructions for receiving sidelink data from the second UE and generating the sidelink feedback channel message including the one or more feedback indications for transmission to the second UE based on receiving the sidelink data from the second UE, where the one or more feedback indications include hybrid automatic repeat request feedback for the sidelink data.

Some examples of the method, apparatuses, and non-transitory computer-readable medium described herein may further include operations, features, means, or instructions for receiving sidelink control information from a second UE reserving resources for sidelink communications, where each of the one or more collision indications indicates that the resources reserved by the second UE at least partially overlaps with the resources reserved by a third UE.

DETAILED DESCRIPTION

Some wireless communications systems may support sidelink communications between user equipment (UEs). In such systems, it may be appropriate for UEs to exchange messages to coordinate communications on sidelink resources (e.g., to avoid interference and collisions). Such messages may be referred to as inter-UE coordination messages. In an example, if a first UE detects a conflict between a second UE and a third UE, the first UE may transmit a collision indication (e.g., an inter-UE coordination message) to the second UE and the third UE indicating the conflict. Although inter-UE coordination messages may help to coordinate sidelink communications, it may be challenging to incorporate these messages in existing sidelink procedures. For instance, techniques for prioritizing feedback messages including feedback indications for sidelink data and collision indications may be undefined.

As described herein, a wireless communications system may support efficient techniques for reporting sidelink feedback when a first UE identifies feedback indications and collision indications to transmit to a second UE. In one aspect, the first UE may generate a feedback message including both feedback indications and collision indications, and the first UE may prioritize the feedback message based on the feedback indications, the collision indications, or both. For instance, the first UE may prioritize the feedback message according to a highest priority of the priorities of the feedback indications in the feedback message, or the first UE may prioritize the feedback message according to a highest priority of the priorities of the feedback indications and the collision indications in the feedback message. In another aspect, the first UE may avoid including collision indications in a same feedback message as feedback indications.

Aspects of the disclosure are initially described in the context of wireless communications systems. Examples of processes and signaling exchanges that support prioritization between feedback and collision indications are then described. Aspects of the disclosure are further illustrated by and described with reference to apparatus diagrams, system diagrams, and flowcharts that relate to prioritization between feedback and collision indications.

Figure 1:
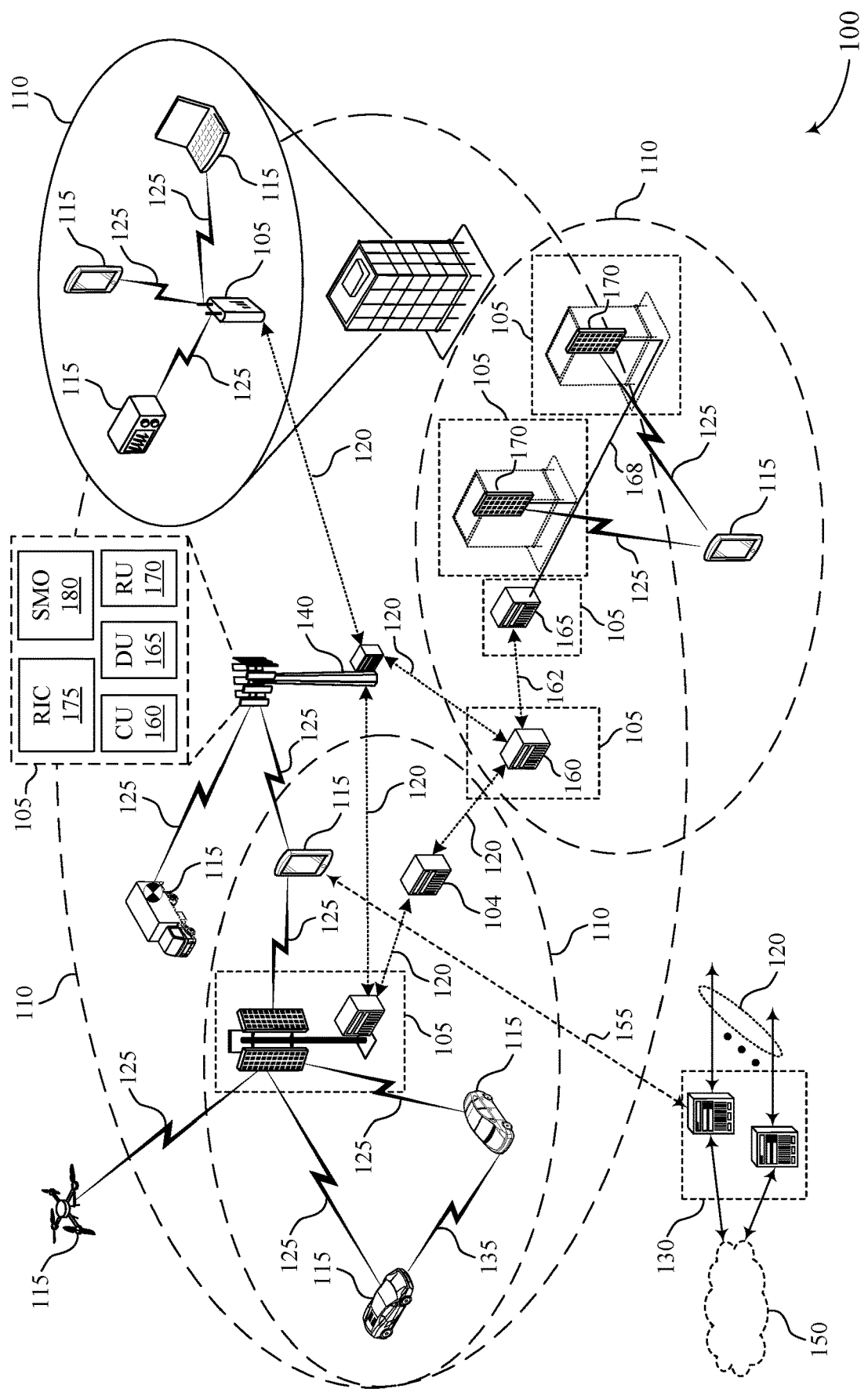
FIG. 1 illustrates an example of a wireless communications system that supports prioritization between feedback and collision indications in accordance with one or more aspects of the present disclosure.

FIG. 1 illustrates an example of a wireless communications system 100 that supports prioritization between feedback and collision indications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support prioritization between feedback and collision indications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 (e.g., in a physical downlink control channel (PDCCH) or a physical downlink shared channel (PDSCH)), uplink transmissions (e.g., return link transmissions) from a UE 115 to a network entity 105 (e.g., in a physical uplink control channel (PUCCH) or a physical uplink shared channel (PUSCH)), or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ feedback may include an acknowledgment (ACK) indicating that a device successfully received and decoded data, and HARQ feedback may include a negative acknowledgment (NACK) indicating that a device failed to receive or decode data. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In wireless communications system 100, sidelink communications may include communications over one or more sidelink channels. For instance, sidelink data transmissions may be over a physical sidelink shared channel (PSSCH), sidelink discovery expression transmissions may be over a physical sidelink discovery channel (PSDCH) (e.g., to allow proximal devices to discover each other's presence), sidelink control information transmissions may be over a physical sidelink control channel (PSCCH), sidelink feedback transmissions may be over a physical sidelink feedback channel (PSFCH), and sidelink broadcast transmissions may be over a physical sidelink broadcast channel (PSBCH). Sidelink communications may also include transmitting reference signals from one UE 115 to another UE 115.

In some aspects, a network entity 105 may facilitate the scheduling of resources for sidelink communications (e.g., in a resource allocation mode-1 or mode-1 sidelink communications). In other aspects, sidelink communications may be carried out between UEs 115 without the involvement of a network entity 105 (e.g., in a resource allocation mode-2 or mode-2 sidelink communications). In mode-2 sidelink communications, sidelink UEs 115 may autonomously reserve resources (e.g., without the involvement of a network entity 105). That is, mode-2 sidelink communications may be supported without the presence of a central entity (e.g., such as a network entity 105). After identifying resources to reserve for one or more sidelink transmissions, a UE 115 may transmit sidelink control information (SCI) on sidelink resources to reserve the identified resources.

In some cases, to improve scheduling and avoid interference and collisions in mode-2 sidelink communications, UEs 115 may exchange messages to coordinate communications on sidelink resources. Such messages may be referred to as inter-UE coordination messages. In an example, if a first UE 115 detects a conflict between a second UE and a third UE, the first UE 115 may transmit a collision indication (e.g., an inter-UE coordination message) to the second UE 115 and the third UE 115 indicating the conflict. Thus, the collision indication may be an example of coordination information sent from a first UE 115 to a second UE 115 in the presence of an expected or potential conflict and/or a detected resource conflict on resources indicated in the SCI transmitted by the second UE 115. In some cases, the first UE 115 may down-select between an expected or potential conflict and a detected resource conflict.

Figure 2:
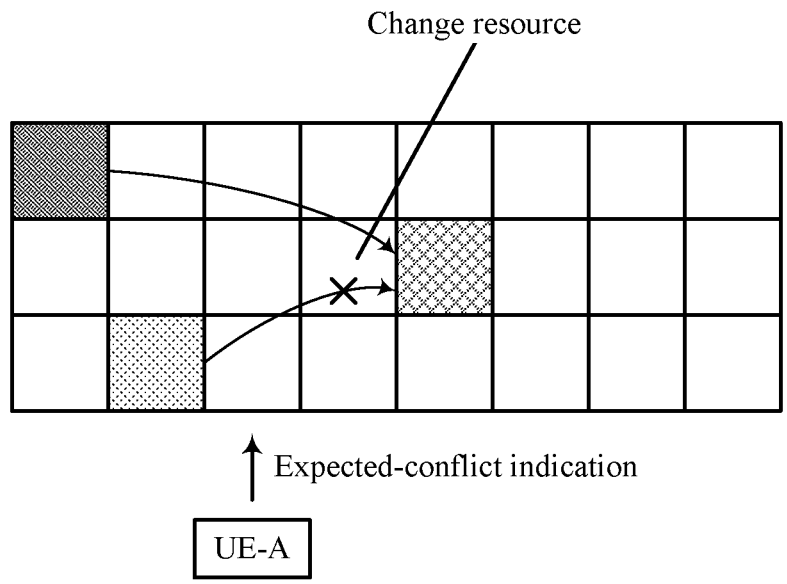
FIG. 2 illustrates an example of a conflicting sidelink reservation in accordance with one or more aspects of the present disclosure.

FIG. 2 illustrates an example of a conflicting sidelink reservation 200 in accordance with one or more aspects of the present disclosure. A first UE 115 (e.g., UE0) may transmit first SCI 205 indicating that the first UE 115 is to transmit a sidelink transmission on a resource 215, and a second UE 115 (e.g., UE1) may transmit second SCI 210 indicating that the second UE 115 is to transmit a sidelink transmission on the same resource 215 as the first UE 115. A third UE 115 (e.g., UE-A) may receive the first SCI from the first UE 115 and the second SCI from the second UE 115, and the third UE 115 may detect the conflict between the first UE 115 and the second UE 115 on the resource 215. As such, the third UE 115 may transmit a collision indication or a conflict indication (e.g., in a PSFCH) based on detecting the conflict between the first UE 115 and the second UE 115 on the resource 215. The second UE 115 may receive the collision indication or the conflict indication and may change a resource to be used for a sidelink transmission (e.g., to avoid the conflict).

Thus, the third UE 115 may indicate an expected or potential resource conflict with resources indicated by the second SCI received from the second UE 115. In some examples, a conflict between UEs 115 may occur in a current or next transport block period if one UE's reservation overlaps with another UE's reservation. The example described with reference to FIG. 2 is an example of a reservation by a first UE 115 overlapping with a reservation by a second UE 115 (e.g., where a reservation by a UE 115 indicates a resource to be used by the UE 115 for a sidelink transmission). In other examples, a conflict between UEs 115 may occur in a current or next transport block period if a UE 115 has a half-duplex conflict. A half-duplex conflict may occur if a half-duplex UE 115 transmits an SCI indicating that the half-duplex UE 115 is to transmit a sidelink transmission, and another UE 115 transmits another SCI indicating that the other UE 115 is to transmit a sidelink transmission to the half-duplex UE 115 at the same time as the sidelink transmission from the half-duplex UE 115.

Figure 3:
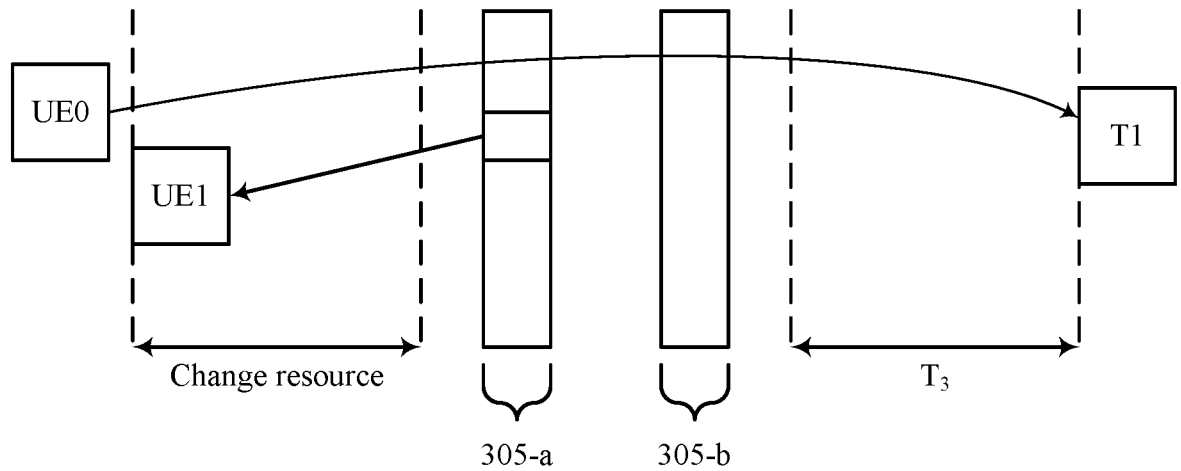
FIG. 3 illustrates an example of collision indication in accordance with one or more aspects of the present disclosure.
Figure 3:
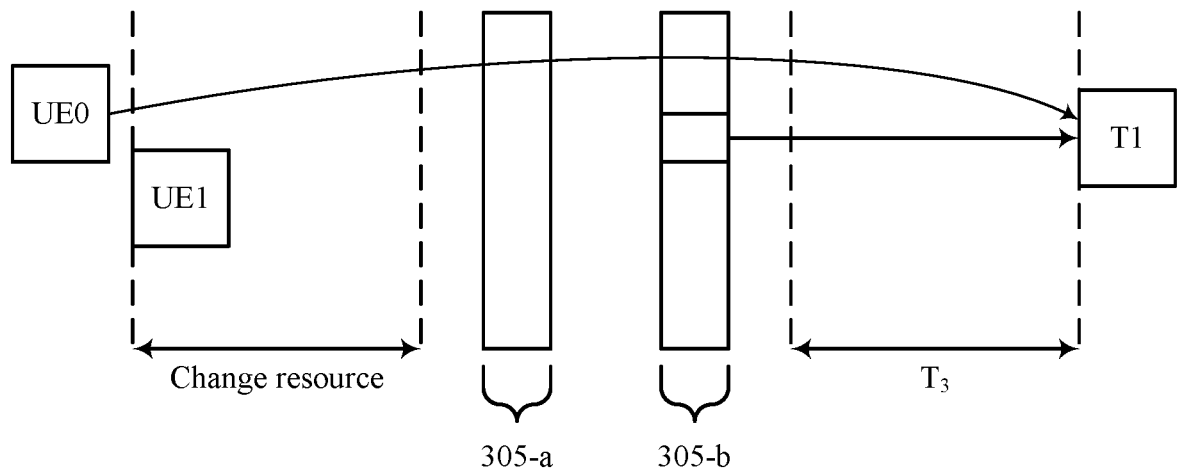

FIG. 3 illustrates an example of collision indication 300 in accordance with one or more aspects of the present disclosure. A first UE 115 (UE0) may reserve a resource (T1) for sidelink communications, and a second UE 115 (UE1) may also reserve the resource (T1) for sidelink communications. A third UE 115 may receive SCIs and may detect the conflict between the first UE 115 and the second UE 115. A mapping from a detected conflict to a PSFCH resource (e.g., in which to transmit a collision indication) may depend on the location of the SCI causing the conflict or the resource with the conflict (T1). In one case, the third UE 115 may transmit a collision indication in the PSFCH 305-*b* if the mapping depends on the location of the SCI causing the conflict. The collision indication may indicate the conflict between the first UE 115 (UE0) and the second UE 115 (UE1). In another case, the third UE 115 may transmit a collision indication in the PSFCH 305-*b* (e.g., after the PSFCH 305-*a* and before the resource (T1)) if the mapping depends on the location of the resource with the conflict (T1). The collision indication may indicate the conflict between the first UE 115 (UE0) and the second UE 115 (UE1).

Although inter-UE coordination messages may help to coordinate sidelink communications, it may be challenging to incorporate these messages in existing sidelink processes. For instance, it may be appropriate to mix feedback indications with collision indications in a feedback message, and techniques for prioritizing such a feedback message may be undefined.

In some aspects, a UE 115 may be configured with a prioritization scheme for prioritization of a PSFCH transmission (Tx) and a PSFCH reception (Rx) (e.g., TX/RX) or for prioritization of two PSFCH transmissions (e.g., TX/TX). The prioritization scheme may indicate that a priority value of a PSFCH transmission for a resource conflict indication (e.g., collision indication) is a smallest priority value of conflicting transport blocks (e.g., being indicated by the resource conflict indication). The prioritization scheme may also indicate that a priority value of a PSFCH reception for a resource conflict indication is a priority value indicated by SCI from a second UE 115 (e.g., UE-B) reserving a conflicting resource. For PSFCH Tx/Rx or Tx/Tx prioritization between sidelink HARQ-ACK feedback(s) and resource conflict indication(s), PSFCH Tx/Rx for sidelink HARQ-ACK feedback may always be prioritized over PSFCH Tx/Rx for a resource conflict indication. Further, when PSFCH Tx/Rx is overlapping with LTE sidelink Tx/Rx and/or uplink in a UE 115, a UE 115 may reuse a prioritization rule. In some cases, a UE 115 may perform PSFCH Tx/Rx or Tx/Tx prioritization between sidelink HARQ-ACK feedback(s) and resource conflict indication(s) first, and then the UE 115 may perform prioritization between prioritized PSFCH Tx(s) or Rx(s) and LTE sidelink Tx/Rx or UL by reusing a prioritization rule.

In an example, a UE 115 may prioritize a PSFCH including ACK/NACK feedback based on the ACK/NACK feedback indications included in the PSFCH (e.g., the UE 115 may prioritize an ACK/NACK PSFCH transmission). The ACK/NACK feedback indications may simply be referred to as feedback indications. The UE 115 may also prioritize a PSFCH including conflict or collision feedback using the techniques described above. In some cases, however, if the number of PSFCH sequences of feedback indications is less than a maximum number of PSFCH sequences that may be included in a PSFCH message or waveform, a UE 115 (e.g., a transmitting UE 115) may fill the remaining sequences in the PSFCH message or waveform with collision indications. Thus, a UE 115 may transmit or receive a PSFCH message or waveform including feedback indications and collision indications. As a result, there may be a mix of feedback indications and collision indications in a PSFCH message or waveform (e.g., transmission or reception), and the PSFCH message or waveform may be referred to as a combined PSFCH. However, techniques for prioritizing a combined PSFCH may be undefined (e.g., the priority of a combined PSFCH may not be handled).

Without information related to prioritizing combined PSFCHs, a UE 115 may be unable to prioritize between an overlapping PSFCH transmission and PSFCH reception, between an overlapping NR V2X PSFCH transmission or reception and an LTE V2X transmission or reception, or between an NR V2X PSFCH transmission or reception and an uplink transmission. Further, because the UE 115 may be a half-duplex UE 115, the UE 115 may be unable to simultaneously receive a PSFCH message or waveform and transmit a PSFCH message or waveform. Thus, if the UE 115 is unable to simultaneously receive a PSFCH message or waveform and transmit a PSFCH message or waveform, and the UE 115 is unable to prioritize transmission and reception of PSFCH messages or waveforms, the UE 115 may be unable to determine whether to receive a PSFCH message or waveform or transmit a PSFCH message or waveform when the UE 115 has feedback to both transmit and receive. The UE 115 may also be unable to determine which PSFCH message or waveform to transmit when the UE 115 has multiple PSFCH messages or waveforms to transmit, and the UE 115 may be unable to determine which PSFCH message or waveform to receive when the UE 115 has multiple PSFCH messages or waveforms to receive.

In one example, a UE 115 may identify a first feedback message for transmission with five feedback indications (e.g., each assigned a priority value of eight) and three collision indications (e.g., each assigned a priority value of one). The UE 115 may also identify a second feedback message for reception with five feedback indications (e.g., each assigned a priority value of five). A priority value of one may be assigned a higher priority than a priority value of eight, and a priority value of five may be associated with a higher priority than a priority value of eight but may be associated with a lower priority than a priority value of one. That is, lower priority values may be associated with higher priorities, and higher priority values may be associated with lower priorities. Although the UE 115 may be able to determine the priority value of the second feedback message (e.g., that only includes feedback indications) to be five according to an existing procedure, the UE 115 may be unable to determine the priority value of the first feedback message (e.g., that includes both feedback indications and collision indications). Thus, the UE 115 may be unable to determine whether to transmit the first feedback message or receive the second feedback message in a PSFCH resource location.

In another example, a UE 115 may identify a first feedback message for transmission with five feedback indications (e.g., each assigned a priority value of five). The UE 115 may also identify a second feedback message for reception with five feedback indications (e.g., each assigned a priority value of eight) and three collision indications (e.g., each assigned a priority value of one). Although the UE 115 may be able to determine the priority value of the first feedback message (e.g., that only includes feedback indications) to be five according to an existing procedure, the UE 115 may be unable to determine the priority value of the second feedback message (e.g., that includes both feedback indications and collision indications). Thus, the UE 115 may be unable to determine whether to transmit the first feedback message or receive the second feedback message in a PSFCH resource location.

In yet another example, a UE 115 may identify a first feedback message for transmission with five feedback indications (e.g., each assigned a priority value of four) and three collision indications (e.g., each assigned a priority value of one). The UE 115 may also identify a second feedback message for reception with five feedback indications (e.g., each assigned a priority value of five) and three collision indications (e.g., each assigned a priority value of three). A priority value of one may be associated with a higher priority than a priority value of three, a priority value of three may be associated with a higher priority than a priority value of four, and a priority value of four may be associated with a higher priority than a priority value of five. However, the UE 115 may be unable to determine the priority values of the first feedback message and the second feedback message (e.g., since both include feedback indications and collision indications). Thus, the UE 115 may be unable to determine whether to transmit the first feedback message or receive the second feedback message in a PSFCH resource location.

The wireless communications system 100 may support efficient techniques for reporting sidelink feedback when a first UE 115 identifies feedback indications and collision indications to transmit to a second UE 115.

Figure 4:
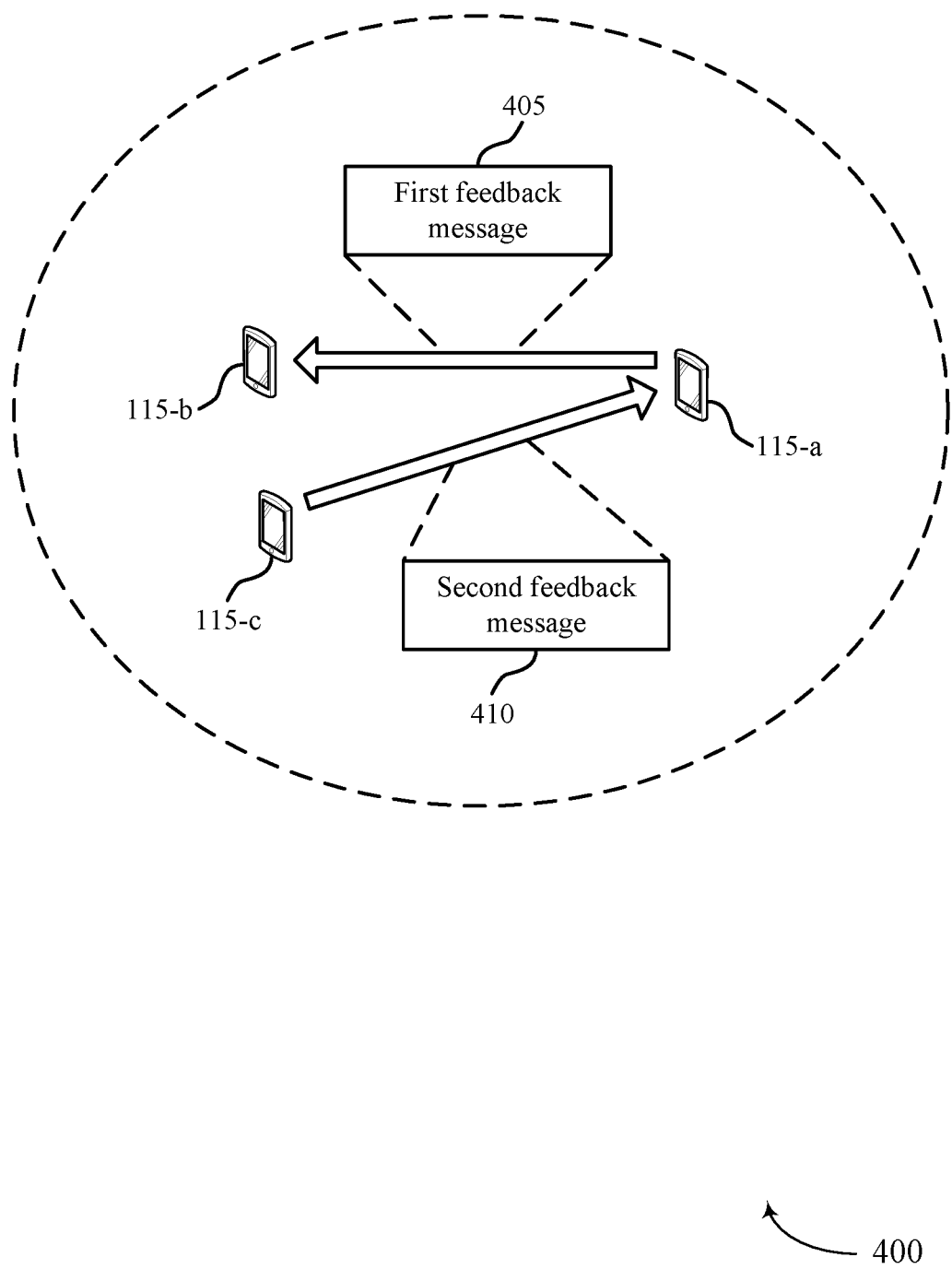
FIG. 4 illustrates an example of a wireless communications system that supports prioritization between feedback and collision indications in accordance with one or more aspects of the present disclosure.

FIG. 4 illustrates an example of a wireless communications system 400 that supports prioritization between feedback and collision indications in accordance with one or more aspects of the present disclosure. The wireless communications system 400 includes a first UE 115-a, a second UE 115-b, and a third UE 115-c, which may be examples of UEs 115 described with reference to FIGS. 1-3. The wireless communications system 400 may implement aspects of the wireless communications system 100. For example, the wireless communications system 400 may support efficient techniques at the first UE 115-a for reporting sidelink feedback to the second UE 115-b when the first UE 115-a identifies feedback indications and collision indications to transmit to the second UE 115-b.

The first UE 115-a may generate a first feedback message 405 (e.g., for transmission to the second UE 115-b), and the first feedback message 405 may include one or more feedback indications and one or more collision indications. The first UE 115-a may generate the one or more feedback indications based on sidelink data transmitted by the second UE 115-b to the first UE 115-a (e.g., based on whether the sidelink data was successfully received and decoded by the first UE 115-a). In addition, the first UE 115-a may receive SCI from the second UE 115-b and may generate the one or more collision indications to indicate a conflict between the second UE 115-*b* and one or more other UEs 115 based on a resource reservation indication in the SCI.

For transmission prioritization, the first UE 115-*a* may assign a priority value to each of the one or more feedback indications based on a priority of the sidelink data (e.g., indicated in corresponding SCI) for which each feedback indication is generated. The first UE 115-*a* may also assign a priority value to each of the one or more collision indications based on the SCI received from the second UE 115-*b* (e.g., based on a priority indicated in the SCI or a priority of a transport block for which the SCI is reserving resources). The first UE 115-*a* may then include a subset or all of the feedback indications in the first feedback message 405, and the first UE 115-*a* may include a subset or all of the collision indications in the first feedback message 405 based on the priorities of the feedback indications, the priorities of the collision indications, or both.

The first UE 115-*a* may also expect a second feedback message 410 from the third UE 115-*c* in a same PSFCH as the first feedback message 405, and the second feedback message 410 may include one or more feedback indications and one or more collision indications. For instance, the first UE 115-*a* may transmit sidelink data to the third UE 115-*c* and may expect one or more feedback indications in the second feedback message 410 based on transmitting the sidelink data to the third UE 115-*c* (e.g., based on whether the sidelink data was successfully received and decoded by the third UE 115-*c*). The first UE 115-*a* may also transmit SCI reserving resources for sidelink communications, and the first UE 115-*a* may determine that the second feedback message 410 may include the one or more collision indications based on transmitting the SCI.

For reception prioritization, the first UE 115-*a* may assign a priority value to each of the one or more feedback indications based on a priority of the sidelink data (e.g., indicated in corresponding SCI) for which each feedback indication is generated. The first UE 115-*a* may also assign a priority value to each of the one or more collision indications based on the SCI transmitted by the first UE 115-*a* (e.g., based on a priority indicated by the SCI or a priority of a transport block for which the SCI is reserving resources). The first UE 115-*a* may then determine or estimate whether the second feedback message 410 includes a subset or all of the feedback indications and whether the second feedback message includes a subset or all of the collision indications based on the priorities of the feedback indications, the priorities of the collision indications, or both.

Thus, the first feedback message 405 and the second feedback message 410 may each include one or more feedback indications and one or more collision indications, and the first UE 115-*a* may use the techniques described herein to prioritize between the first feedback message 405 and the second feedback message 410. That is, the first UE 115-*a* may use the techniques described herein for PSFCH prioritization if there is a mix of feedback indications and collision indications in a feedback message (e.g., PSFCH transmission) after transmission prioritization or reception prioritization.

The first UE 115-*a* may prioritize the first feedback message 405 for transmission based on the first feedback message 405 including the one or more feedback indications, the one or more collision indications, or both. In one aspect, the priority of the first feedback message 405 (e.g., a combined PSFCH) may be a highest priority of the feedback indications in the first feedback message 405 (e.g., ACK/NACK PSFCH only, ignoring collision indications or priorities of collision indications). In another aspect, the priority of the first feedback message 405 may be a highest priority of the feedback indications and collision indications in the first feedback message 405 (e.g., ACK/NACK PSFCH and collision indication PSFCH). In yet another aspect, the first UE 115-*a* may be configured to avoid adding collision indications to the first feedback message 405 after adding the feedback indications to the first feedback message 405 (e.g., after prioritization of an ACK/NACK PSFCH transmission, the UE 115-*a* may not add collision PSFCHs). In this aspect, the priority of the first feedback message 405 (e.g., a combined PSFCH) may be a highest priority of the feedback indications in the first feedback message 405.

The first UE 115-*a* may also prioritize the second feedback message 410 for reception based on the second feedback message including one or more feedback indications, one or more collision indications, or both. In one aspect, the priority of the second feedback message 410 (e.g., a combined PSFCH) may be a highest priority of the feedback indications in the second feedback message 410 (e.g., ACK/NACK PSFCH only, ignoring collision indications or priorities of collision indications). In another aspect, the priority of the second feedback message 410 may be a highest priority of the feedback indications and collision indications in the second feedback message 410 (e.g., ACK/NACK PSFCH and collision indication PSFCH). In yet another aspect, the third UE 115-*c* may be configured to avoid adding collision indications to the second feedback message 410 after adding the feedback indications to the second feedback message 410 (e.g., after prioritization of an ACK/NACK PSFCH transmission, the UE 115-*c* may not add collision PSFCHs). Thus, the first UE 115-*a* may determine a priority of the second feedback message 410 based only on the feedback indications expected to be included in the second feedback message 410. In this aspect, the priority of the second feedback message 410 (e.g., a combined PSFCH) may be a highest priority of the feedback indications in the first feedback message 410.

Once the first UE 115-*a* assigns a first priority to the first feedback message 405 and a second priority to the second feedback message 410, the UE 115-*a* may compare the first priority and the second priority and determine whether to transmit the first feedback message 405 or the second feedback message 410 based on whether the determined priority value of the first feedback message 405 is higher than the determined priority value of the second feedback message 410.

Although the techniques described with reference to FIG. 4 relate to prioritization between sidelink feedback messages (e.g., sidelink feedback channel messages) for transmission and reception, the same or similar techniques may be used for prioritization between a sidelink feedback message associated with a first RAT and another message associated with a second RAT or between a sidelink feedback message and an uplink message. That is, a UE 115 may use the described techniques for prioritization between feedback messages for transmission and reception (e.g., Tx/Rx PSFCH prioritization), between a feedback message associated with one RAT and another message associated with a different RAT (e.g., NR V2X Tx/Rx PSFCH and LTE V2X Tx/Rx prioritization), or between a feedback message and an uplink message (e.g., NR V2X Tx/Rx PSFCH and uplink).

In some aspects, the prioritization of a feedback message based on a highest priority of feedback indications in the feedback message may be referred to as a first prioritization procedure, and the prioritization of a feedback message based on a highest priority of feedback indications and collision indications in the feedback message may be referred to as a second prioritization procedure. In some cases, a UE 115 may receive control signaling (e.g., RRC signaling) from a network entity configuring the UE 115 to use the first prioritization procedure, the second prioritization procedure, or both for prioritization of feedback messages. Alternatively, the UE 115 may be able to determine whether to use the first prioritization procedure, the second prioritization procedure, or both for prioritization of feedback messages without signaling from a network entity.

In some examples, a UE 115 may be configured to use the first prioritization procedure for both Tx/Rx PSFCH prioritization, NR V2X Tx/Rx PSFCH and LTE V2X Tx/Rx prioritization, and NR V2X Tx/Rx PSFCH and uplink prioritization. In other examples, a UE 115 may be configured to use the second prioritization procedure for both Tx/Rx PSFCH prioritization, NR V2X Tx/Rx PSFCH and LTE V2X Tx/Rx prioritization, and NR V2X Tx/Rx PSFCH and uplink prioritization. In yet other examples, a UE 115 may be configured to use the first prioritization procedure for both Tx/Rx PSFCH prioritization, and the UE 115 may be configured to use the second prioritization procedure for NR V2X Tx/Rx PSFCH and LTE V2X Tx/Rx prioritization and NR V2X Tx/Rx PSFCH and uplink prioritization.

For instance, the UE 115 may assign priorities to feedback messages in a same PSFCH using the first prioritization procedure, and the UE 115 may compare the priorities of the feedback messages to select a feedback message to transmit or receive in the PSFCH. The UE 115 may then assign a priority to the selected feedback message using the second prioritization procedure, and the UE 115 may compare the priority of the feedback message to priorities of LTE messages or uplink messages to select a message to transmit or receive in the PSFCH. Thus, the combined priority of a feedback message may change between using the first prioritization procedure and using the second prioritization procedure. The first prioritization procedure may allow feedback indications to be prioritized over collision indications between transmissions and receptions, and the second prioritization procedure may allow high priority collision indications to be prioritized over LTE messages or uplink messages.

Figure 5:
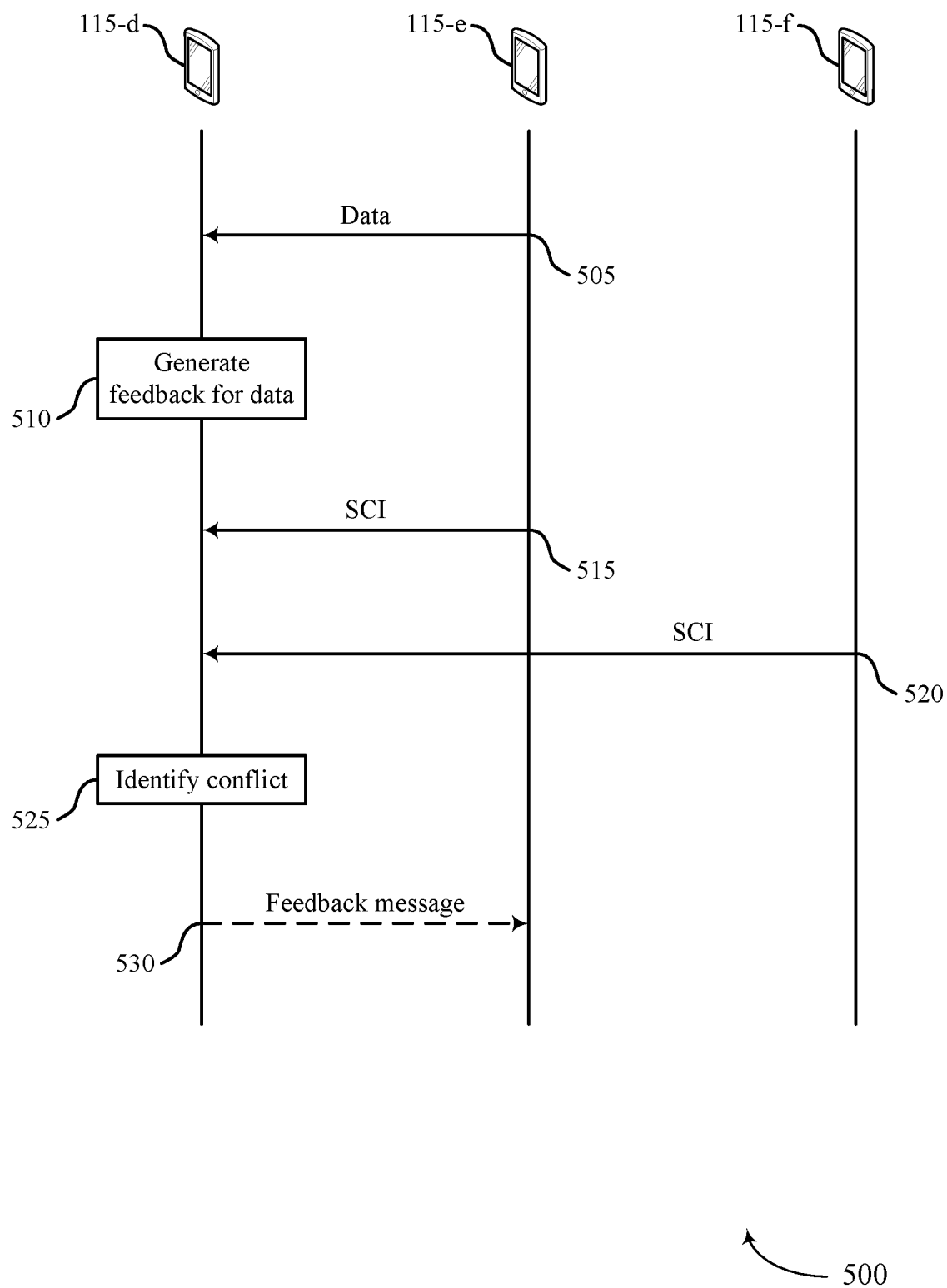
FIG. 5 illustrates an example of a process flow that supports prioritization between feedback and collision indications in accordance with one or more aspects of the present disclosure.

FIG. 5 illustrates an example of a process flow 500 that supports prioritization between feedback and collision indications in accordance with one or more aspects of the present disclosure. Process flow 500 includes a first UE 115-*d*, a second UE 115-*e*, and a third UE 115-*f*, which may be examples of UEs 115 described with reference to FIGS. 1-4. The process flow 500 may implement aspects of the wireless communications system 100 or the wireless communications system 400. For example, the process flow 500 may support efficient techniques at the first UE 115-*d* for reporting sidelink feedback to the second UE 115-*e* when the first UE 115-*d* identifies feedback indications and collision indications to transmit to the second UE 115-*e*.

In the following description of the process flow 500, the signaling exchanged between the first UE 115-*d*, the second UE 115-*e*, and the third UE 115-*f* may be exchanged in a different order than the example order shown, or the operations performed by the first UE 115-*d*, the second UE 115-*e*, and the third UE 115-*f* may be performed in different orders or at different times. Some operations may also be omitted from the process flow 500, and other operations may be added to the process flow 500.

At 505, the first UE 115-*d* may receive sidelink data from the second UE 115-*e*. At 510, the first UE 115-*d* may generate feedback for the sidelink data received at 505. For instance, if the first UE 115-*d* failed to receive or decode the sidelink data from the second UE 115-*e*, the first UE 115-*d* may generate a NACK for transmission to the second UE 115-*e*. Alternatively, if the first UE 115-*d* successfully received and decoded the sidelink data from the second UE 115-*e*, the first UE 115-*d* may generate an ACK for transmission to the second UE 115-*e*. At 515, the first UE 115-*d* may receive first SCI from the second UE 115-*e* reserving a first set of resources for sidelink communications, and, at 520, the first UE 115-*d* may receive second SCI from the third UE 115-*f* reserving a second set of resources for sidelink communications. At 525, the first UE 115-*d* may identify a conflict between the second UE 115-*e* and the third UE 115-*f* based on determining that the first set of resources reserved by the second UE 115-*e* at least partially overlaps with the second set of resources reserved by the third UE 115-*f*.

The first UE 115-*d* may then generate a feedback message including the feedback indication generated at 510 and a collision indication indicating the conflict identified at 525. In some cases, the first UE 115-*d* may also include other feedback indications and other collision indications for the second UE 115-*e* in the feedback message. Thus, the feedback message may include one or more feedback indications and one or more collision indications. The first UE 115-*d* may assign a first priority to the feedback message based on a first prioritization rule for assigning priorities to sidelink feedback channel messages including both feedback indications and collision indications. The first prioritization rule may be based on one or more first priorities of the one or more feedback indications, one or more second priorities of the one or more collision indications, or both.

In one aspect, the first UE 115-*d* may determine, according to a first prioritization procedure, a highest priority of the one or more first priorities of the one or more feedback indications. The highest priority of the one or more first priorities of the one or more feedback indications may correspond to the first priority of the feedback message. In some cases, the first prioritization rule may indicate that the first UE 115-*d* is to use the first prioritization procedure for communication prioritization between sidelink feedback channel messages for transmission and reception, between a sidelink feedback channel message associated with a first RAT and another message associated with a second RAT, and between a sidelink feedback channel message and an uplink message.

In another aspect, the first UE 115-*d* may determine, according to a second prioritization procedure, a highest priority of the one or more first priorities of the one or more feedback indications and of the one or more second priorities of the one or more collision indications. The highest priority of the one or more first priorities of the one or more feedback indications and of the one or more second priorities of the one or more collision indications may correspond to the first priority of the first sidelink feedback channel message. In some cases, the first prioritization rule may indicate using the second prioritization procedure for communication prioritization between sidelink feedback channel messages for transmission and reception, between a sidelink feedback channel message associated with a first RAT and another message associated with a second RAT, and between a sidelink feedback channel message and an uplink message.

In some cases, the first prioritization rule may indicate using a first prioritization procedure for communication prioritization between sidelink feedback channel messages for transmission and reception, and the first prioritization rule may indicate using a second prioritization procedure for communication prioritization between a sidelink feedback channel message associated with a first RAT and another message associated with a second RAT or between a sidelink feedback channel message and an uplink message. In some cases, the first prioritization procedure may indicate using a highest priority of the one or more first priorities of the one or more feedback indications as the first priority, and the second prioritization procedure may indicate using a highest priority of the one or more first priorities of the one or more feedback indications and of the one or more second priorities of the one or more collision indications as the first priority.

In addition to assigning a first priority to the feedback message, the first UE 115-d may assign a second priority to a second message based on a second prioritization rule. Thus, the feedback message may be referred to as a first sidelink feedback channel message. The second message may be scheduled on overlapping resources with the first sidelink feedback channel message. The first UE 115-d may compare the first priority of the first sidelink feedback channel message and the second priority of the second message to determine whether to transmit the first sidelink feedback channel message or to transmit or receive the second message. In some cases, the second message may be a second sidelink feedback channel message for transmission or reception by the first UE 115-d. In some cases, the second message may be a message associated with a different RAT from the first sidelink feedback channel message. In some cases, the second message may be an uplink message.

At 530, the first UE 115-d may transmit the first sidelink feedback channel message when the first priority of the first sidelink feedback channel message is higher than the second priority of the second message. Alternatively, the first UE 115-d may transmit or receive the second message when the second priority of the second message is higher than the first priority of the first sidelink feedback channel message.

Although the techniques described above are related to prioritizing the first sidelink feedback channel message including the one or more feedback indications and the one or more collision indications, in some aspects, the first UE 115-d may avoid including the one or more collision indications for transmission to the second UE 115-e in the first sidelink feedback channel message. In such aspects, the first UE 115-d may determine the first priority of the first sidelink feedback channel message based on one or more priorities of the one or more feedback indications.

Figure 6:
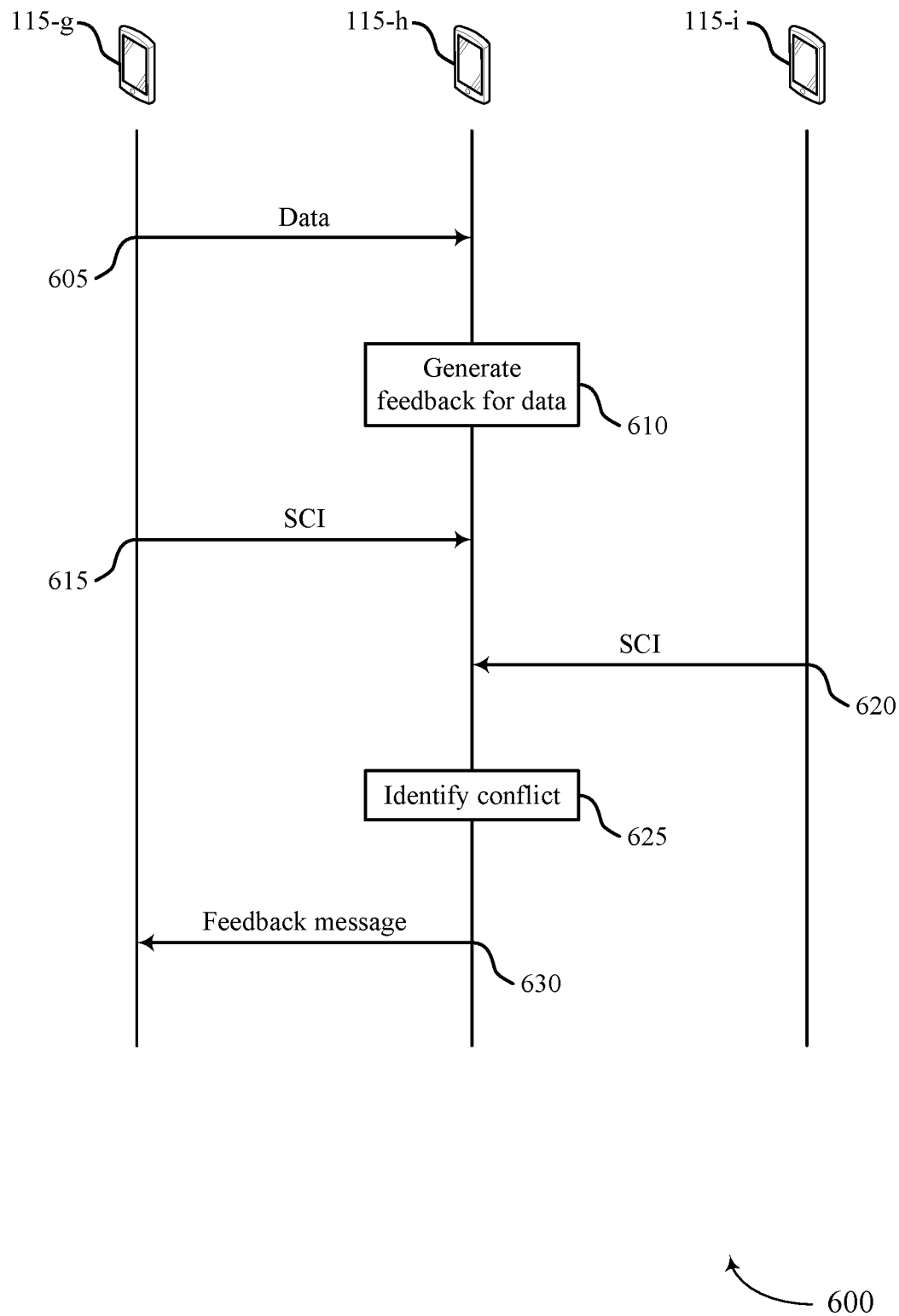
FIG. 6 illustrates an example of a process flow that supports prioritization between feedback and collision indications in accordance with one or more aspects of the present disclosure.

FIG. 6 illustrates an example of a process flow 600 that supports prioritization between feedback and collision indications in accordance with one or more aspects of the present disclosure. Process flow 600 includes a first UE 115-g, a second UE 115-h, and a third UE 115-i, which may be examples of UEs 115 described with reference to FIGS. 1-5. The process flow 600 may implement aspects of the wireless communications system 100 or the wireless communications system 400. For example, the process flow 600 may support efficient techniques at the first UE 115-g for receiving sidelink feedback from the second UE 115-h when the first UE 115-g identifies feedback indications and collision indications in the sidelink feedback.

In the following description of the process flow 600, the signaling exchanged between the first UE 115-g the second UE 115-h, and the third UE 115-i may be exchanged in a different order than the example order shown, or the operations performed by the first UE 115-g the second UE 115-h, and the third UE 115-i may be performed in different orders or at different times. Some operations may also be omitted from the process flow 600, and other operations may be added to the process flow 600.

At 605, the first UE 115-g may transmit sidelink data to the second UE 115-h. At 610, the second UE 115-h may generate feedback for the sidelink data received at 505. For instance, if the second UE 115-h failed to receive or decode the sidelink data from the first UE 115-g, the second UE 115-h may generate a NACK for transmission to the first UE 115-g. Alternatively, if the second UE 115-h successfully received and decoded the sidelink data from the first UE 115-g, the second UE 115-h may generate an ACK for transmission to the first UE 115-g. At 615, the second UE 115-h may receive first SCI from the first UE 115-g reserving a first set of resources for sidelink communications, and, at 620, the second UE 115-h may receive second SCI from the third UE 115-i reserving a second set of resources for sidelink communications. At 625, the second UE 115-h may identify a conflict between the first UE 115-g and the third UE 115-i based on determining that the first set of resources reserved by the first UE 115-g at least partially overlaps with the second set of resources reserved by the third UE 115-i.

At 630, the second UE 115-h may then transmit a feedback message including the feedback indication generated at 610 and a collision indication indicating the conflict identified at 625. In some cases, the second UE 115-h may also include other feedback indications and other collision indications for the first UE 115-g in the feedback message. Thus, the feedback message may include one or more feedback indications and one or more collision indications. The first UE 115-g may assign a first priority to the feedback message based on a first prioritization rule for assigning priorities to sidelink feedback channel messages including both feedback indications and collision indications. The first prioritization rule may be based on one or more first priorities of the one or more feedback indications, one or more second priorities of the one or more collision indications, or both.

In one aspect, the first UE 115-g may determine, according to a first prioritization procedure, a highest priority of the one or more first priorities of the one or more feedback indications. The highest priority of the one or more first priorities of the one or more feedback indications may correspond to the first priority of the feedback message. In some cases, the first prioritization rule may indicate that the first UE 115-g is to use the first prioritization procedure for communication prioritization between sidelink feedback channel messages for transmission and reception, between a sidelink feedback channel message associated with a first RAT and another message associated with a second RAT, and between a sidelink feedback channel message and an uplink message.

In another aspect, the first UE 115-g may determine, according to a second prioritization procedure, a highest priority of the one or more first priorities of the one or more feedback indications and of the one or more second priorities of the one or more collision indications. The highest priority of the one or more first priorities of the one or more feedback indications and of the one or more second priorities of the one or more collision indications may correspond to the first priority of the first sidelink feedback channel message. In some cases, the first prioritization rule may indicate using the second prioritization procedure for communication prioritization between sidelink feedback channel messages for transmission and reception, between a sidelink feedback channel message associated with a first RAT and another message associated with a second RAT, and between a sidelink feedback channel message and an uplink message.

In some cases, the first prioritization rule may indicate using a first prioritization procedure for communication prioritization between sidelink feedback channel messages for transmission and reception, and the first prioritization rule may indicate using a second prioritization procedure for communication prioritization between a sidelink feedback channel message associated with a first RAT and another message associated with a second RAT or between a sidelink feedback channel message and an uplink message. In some cases, the first prioritization procedure may indicate using a highest priority of the one or more first priorities of the one or more feedback indications as the first priority, and the second prioritization procedure may indicate using a highest priority of the one or more first priorities of the one or more feedback indications and of the one or more second priorities of the one or more collision indications as the first priority.

In addition to assigning a first priority to the feedback message, the first UE 115-g may assign a second priority to a second message based on a second prioritization rule. Thus, the feedback message may be referred to as a first sidelink feedback channel message. The second message may be scheduled on overlapping resources with the first sidelink feedback channel message. The UE 115-d may compare the first priority of the first sidelink feedback channel message and the second priority of the second message to determine whether to receive the first sidelink feedback channel message or to transmit or receive the second message. In some cases, the second message may be a second sidelink feedback channel message for transmission or reception by the first UE 115-d. In some cases, the second message may be a message associated with a different RAT from the first sidelink feedback channel message. In some cases, the second message may be an uplink message.

At 630, the first UE 115-g may receive the first sidelink feedback channel message when the first priority of the first sidelink feedback channel message is higher than the second priority of the second message. Alternatively, the first UE 115-g may transmit or receive the second message when the second priority of the second message is higher than the first priority of the first sidelink feedback channel message.

Although the techniques described above are related to prioritizing the first sidelink feedback channel message including the one or more feedback indications and the one or more collision indications, in some aspects, the second UE 115-h may avoid including the one or more collision indications for transmission to the first UE 115-g in the first sidelink feedback channel message. In such aspects, the first UE 115-g may determine the first priority of the first sidelink feedback channel message based on one or more priorities of the one or more feedback indications.

Figure 7:
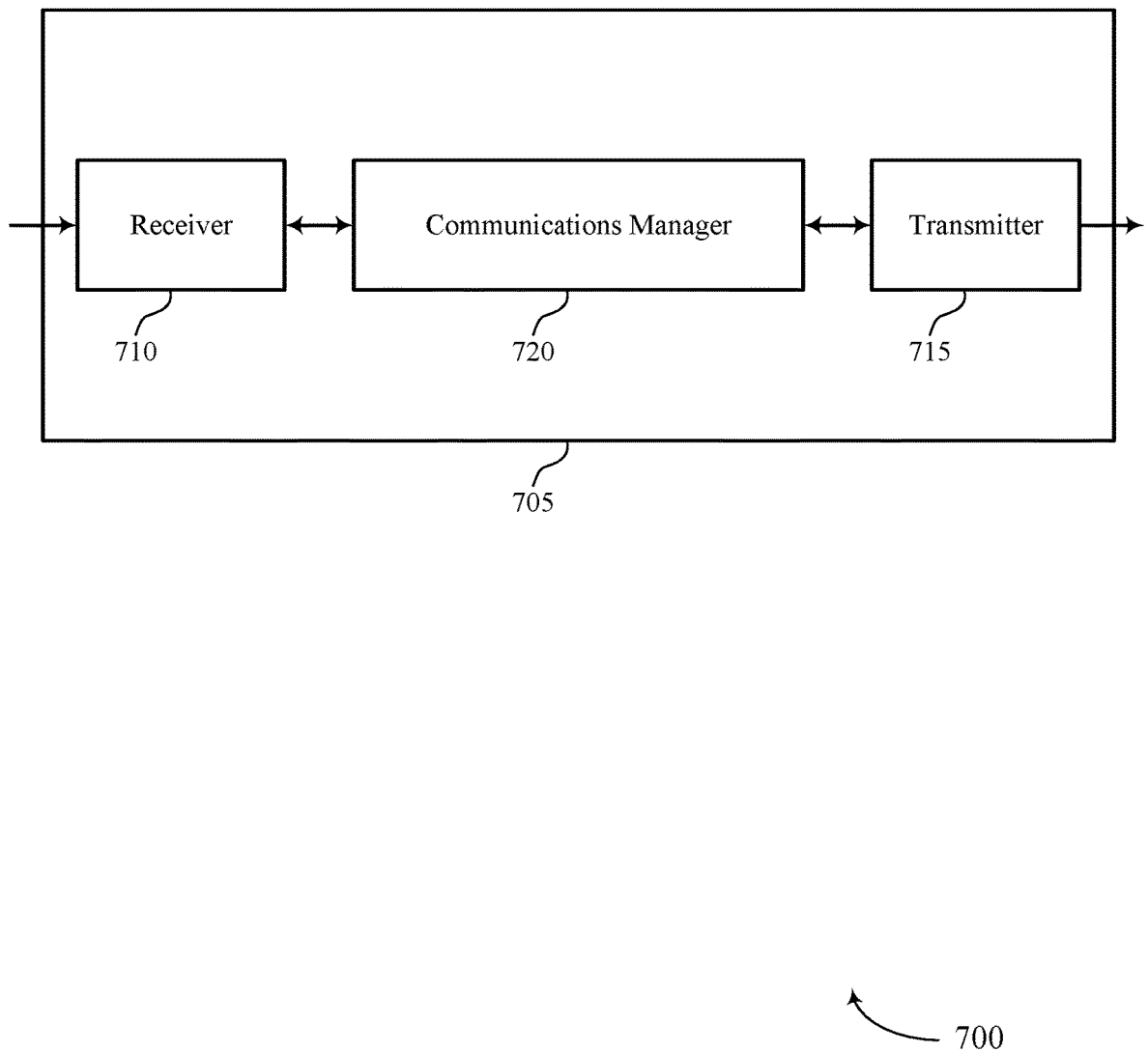
FIGS. 7 and 8 show block diagrams of devices that support prioritization between feedback and collision indications in accordance with one or more aspects of the present disclosure.

FIG. 7 shows a block diagram 700 of a device 705 that supports prioritization between feedback and collision indications in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to prioritization between feedback and collision indications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to prioritization between feedback and collision indications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of prioritization between feedback and collision indications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. For example, the communications manager 720 may be configured as or otherwise support a means for assigning a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both. The communications manager 720 may be configured as or otherwise support a means for assigning a second priority to a second message based on a second prioritization rule, where the second message is scheduled on overlapping resources with the first sidelink feedback channel message. The communications manager 720 may be configured as or otherwise support a means for communicating on the overlapping resources based on a comparison of the first priority of the first sidelink feedback channel message and the second priority of the second message.

Additionally, or alternatively, the communications manager 720 may support wireless communication at a first UE in accordance with examples as disclosed herein. For example, the communications manager 720 may be configured as or otherwise support a means for generating a sidelink feedback channel message to transmit to a second UE, the sidelink feedback channel message including one or more feedback indications. The communications manager 720 may be configured as or otherwise support a means for avoiding including one or more collision indications for transmission to the second UE in the sidelink feedback channel message. The communications manager 720 may be configured as or otherwise support a means for determining a priority of the sidelink feedback channel message based on one or more priorities of the one or more feedback indications. The communications manager 720 may be configured as or otherwise support a means for transmitting the sidelink feedback channel message based on the priority of the sidelink feedback channel message.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources. Because the device 705 may be able to prioritize feedback messages including feedback indications and collision indications, the device 705 may be able to efficiently determine which message to transmit or receive in a PSFCH. As a result, the device 705 may utilize inter-UE coordination messages efficiently and avoid or minimize interference and collisions, resulting in power savings, processing savings, and efficient resource utilization.

Figure 8:
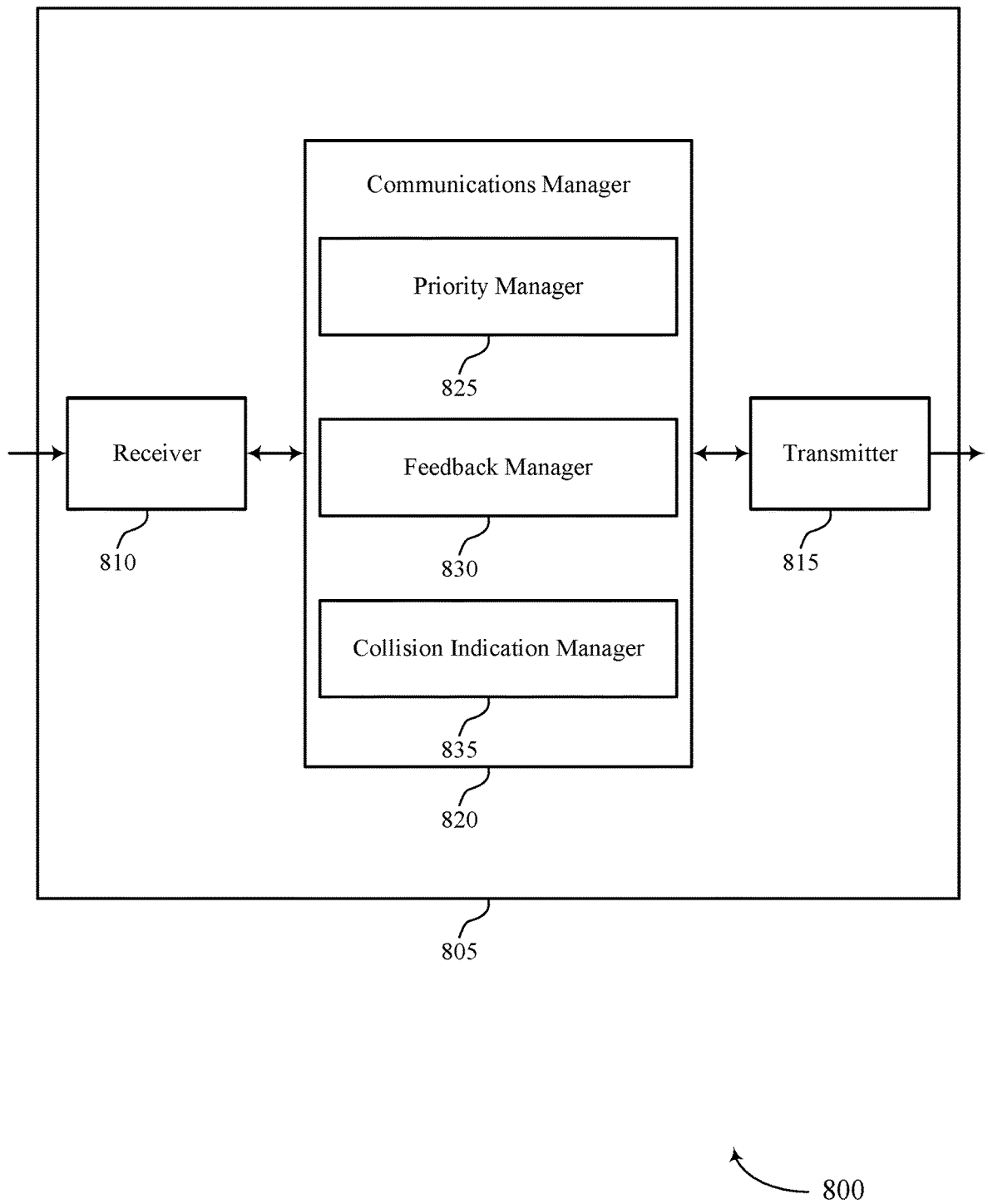

FIG. 8 shows a block diagram 800 of a device 805 that supports prioritization between feedback and collision indications in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to prioritization between feedback and collision indications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to prioritization between feedback and collision indications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of prioritization between feedback and collision indications as described herein. For example, the communications manager 820 may include a priority manager 825, a feedback manager 830, a collision indication manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first UE in accordance with examples as disclosed herein. The priority manager 825 may be configured as or otherwise support a means for assigning a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both. The priority manager 825 may be configured as or otherwise support a means for assigning a second priority to a second message based on a second prioritization rule, where the second message is scheduled on overlapping resources with the first sidelink feedback channel message. The feedback manager 830 may be configured as or otherwise support a means for communicating on the overlapping resources based on a comparison of the first priority of the first sidelink feedback channel message and the second priority of the second message.

Additionally, or alternatively, the communications manager 820 may support wireless communication at a first UE in accordance with examples as disclosed herein. The feedback manager 830 may be configured as or otherwise support a means for generating a sidelink feedback channel message to transmit to a second UE, the sidelink feedback channel message including one or more feedback indications. The collision indication manager 835 may be configured as or otherwise support a means for avoiding including one or more collision indications for transmission to the second UE in the sidelink feedback channel message. The priority manager 825 may be configured as or otherwise support a means for determining a priority of the sidelink feedback channel message based on one or more priorities of the one or more feedback indications. The feedback manager 830 may be configured as or otherwise support a means for transmitting the sidelink feedback channel message based on the priority of the sidelink feedback channel message.

Figure 9:
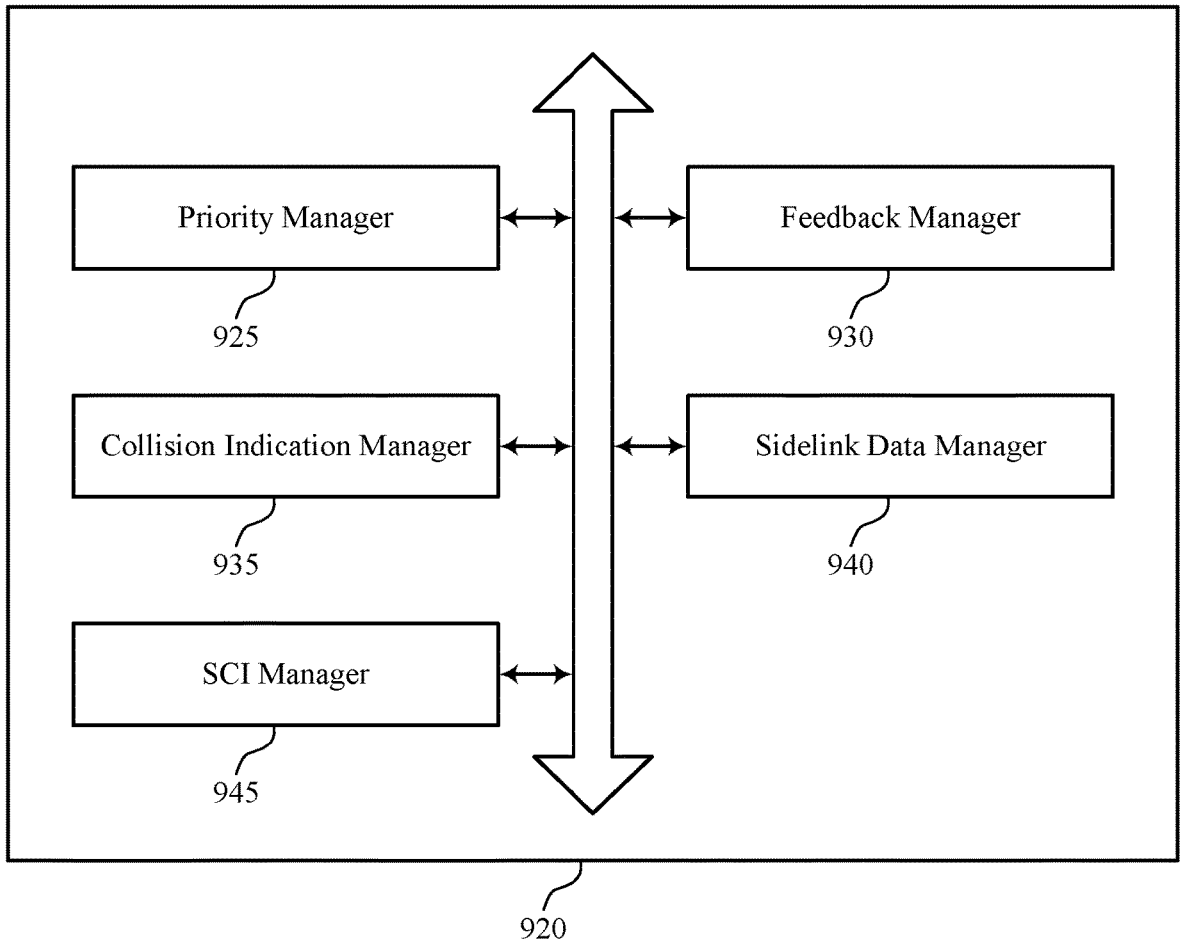
FIG. 9 shows a block diagram of a communications manager that supports prioritization between feedback and collision indications in accordance with one or more aspects of the present disclosure.

FIG. 9 shows a block diagram 900 of a communications manager 920 that supports prioritization between feedback and collision indications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of prioritization between feedback and collision indications as described herein. For example, the communications manager 920 may include a priority manager 925, a feedback manager 930, a collision indication manager 935, a sidelink data manager 940, an SCI manager 945, or any combination thereof. Each of these components may communicate, directly or indirectly, with one another (e.g., via one or more buses).

The communications manager 920 may support wireless communication at a first UE in accordance with examples as disclosed herein. The priority manager 925 may be configured as or otherwise support a means for assigning a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both. In some examples, the priority manager 925 may be configured as or otherwise support a means for assigning a second priority to a second message based on a second prioritization rule, where the second message is scheduled on overlapping resources with the first sidelink feedback channel message. The feedback manager 930 may be configured as or otherwise support a means for communicating on the overlapping resources based on a comparison of the first priority of the first sidelink feedback channel message and the second priority of the second message.

In some examples, to support assigning the first priority of the first message, the priority manager 925 may be configured as or otherwise support a means for determining, according to a first prioritization procedure, a highest priority of the one or more first priorities of the one or more feedback indications, where the highest priority of the one or more first priorities of the one or more feedback indications corresponds to the first priority of the first sidelink feedback channel message.

In some examples, the first prioritization rule indicates using the first prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

In some examples, to support assigning the first priority of the first message, the priority manager 925 may be configured as or otherwise support a means for determining, according to a second prioritization procedure, a highest priority of the one or more first priorities of the one or more feedback indications and of the one or more second priorities of the one or more collision indications, where the highest priority of the one or more first priorities of the one or more feedback indications and of the one or more second priorities of the one or more collision indications corresponds to the first priority of the first sidelink feedback channel message.

In some examples, the first prioritization rule indicates using the second prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

In some examples, the first prioritization rule indicates using a first prioritization procedure for communication prioritization between sidelink feedback channel messages for transmission and reception, and the first prioritization rule indicates using a second prioritization procedure for communication prioritization between a sidelink feedback channel message associated with a first radio access technology and another message associated with a second radio access technology or between a sidelink feedback channel message and an uplink message.

In some examples, the first prioritization procedure indicates using a highest priority of the one or more first priorities of the one or more feedback indications as the first priority, and the second prioritization procedure indicates using a highest priority of the one or more first priorities of the one or more feedback indications and of the one or more second priorities of the one or more collision indications as the first priority.

In some examples, to support communicating on the overlapping resources, the feedback manager 930 may be configured as or otherwise support a means for transmitting or receiving the first sidelink feedback channel message when the first priority of the first sidelink feedback channel message is higher than the second priority of the second message.

In some examples, to support communicating on the overlapping resources, the feedback manager 930 may be configured as or otherwise support a means for transmitting or receiving the second message when the second priority of the second message is higher than the first priority of the first sidelink feedback channel message.

In some examples, the sidelink data manager 940 may be configured as or otherwise support a means for receiving sidelink data from a second UE. In some examples, the feedback manager 930 may be configured as or otherwise support a means for generating the first sidelink feedback channel message including the one or more feedback indications for transmission to the second UE based on receiving the sidelink data from the second UE, where the one or more feedback indications include hybrid automatic repeat request feedback for the sidelink data.

In some examples, the sidelink data manager 940 may be configured as or otherwise support a means for transmitting sidelink data to a second UE. In some examples, the feedback manager 930 may be configured as or otherwise support a means for determining that the first sidelink feedback channel message includes the one or more feedback indications for reception by the first UE based on transmitting the sidelink data to the second UE, where the one or more feedback indications include hybrid automatic repeat request feedback for the sidelink data.

In some examples, the SCI manager 945 may be configured as or otherwise support a means for receiving sidelink control information from a second UE reserving resources for sidelink communications, where the resources reserved by the second UE at least partially overlaps with resources reserved by a third UE. In some examples, the feedback manager 930 may be configured as or otherwise support a means for generating the first sidelink feedback channel message including the one or more collision indications for transmission to the second UE based on receiving the sidelink control information from the second UE, where each of the one or more collision indications indicates that the resources reserved by the second UE at least partially overlaps with the resources reserved by the third UE.

In some examples, the SCI manager 945 may be configured as or otherwise support a means for transmitting sidelink control information reserving resources for sidelink communications. In some examples, the feedback manager 930 may be configured as or otherwise support a means for determining that the first sidelink feedback channel message includes the one or more collision indications for reception by the first UE based on transmitting the sidelink control information, where each of the one or more collision indications indicates that the resources reserved by the first UE at least partially overlaps with the resources reserved by a second UE.

Additionally, or alternatively, the communications manager 920 may support wireless communication at a first UE in accordance with examples as disclosed herein. In some examples, the feedback manager 930 may be configured as or otherwise support a means for generating a sidelink feedback channel message to transmit to a second UE, the sidelink feedback channel message including one or more feedback indications. The collision indication manager 935 may be configured as or otherwise support a means for avoiding including one or more collision indications for transmission to the second UE in the sidelink feedback channel message. In some examples, the priority manager 925 may be configured as or otherwise support a means for determining a priority of the sidelink feedback channel message based on one or more priorities of the one or more feedback indications. In some examples, the feedback manager 930 may be configured as or otherwise support a means for transmitting the sidelink feedback channel message based on the priority of the sidelink feedback channel message.

In some examples, the sidelink data manager 940 may be configured as or otherwise support a means for receiving sidelink data from the second UE. In some examples, the feedback manager 930 may be configured as or otherwise support a means for generating the sidelink feedback channel message including the one or more feedback indications for transmission to the second UE based on receiving the sidelink data from the second UE, where the one or more feedback indications include hybrid automatic repeat request feedback for the sidelink data.

In some examples, the SCI manager 945 may be configured as or otherwise support a means for receiving sidelink control information from a second UE reserving resources for sidelink communications, where each of the one or more collision indications indicates that the resources reserved by the second UE at least partially overlaps with the resources reserved by a third UE.

Figure 10:
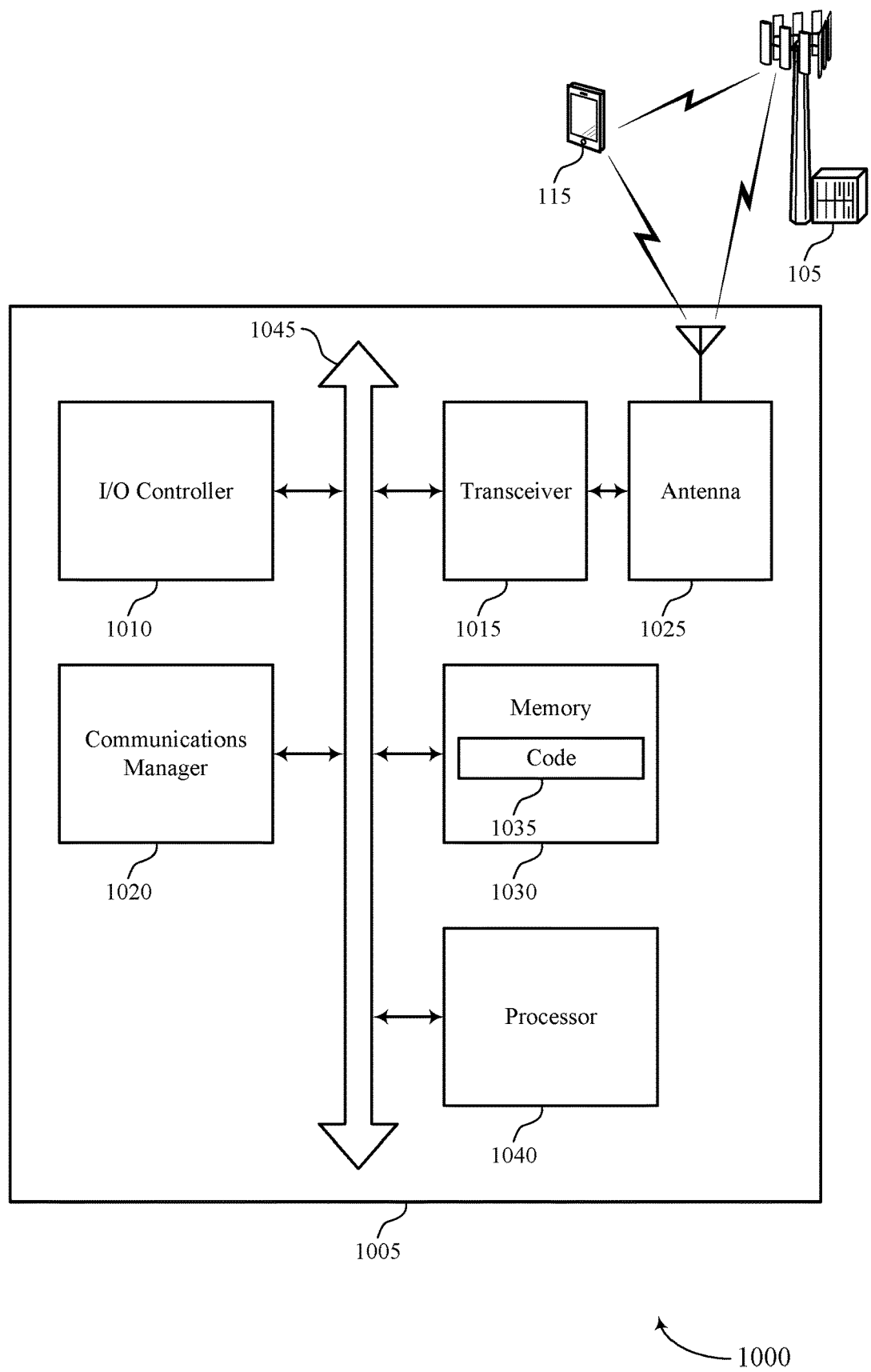
FIG. 10 shows a diagram of a system including a device that supports prioritization between feedback and collision indications in accordance with one or more aspects of the present disclosure.

FIG. 10 shows a diagram of a system 1000 including a device 1005 that supports prioritization between feedback and collision indications in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting prioritization between feedback and collision indications). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for assigning a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both. The communications manager 1020 may be configured as or otherwise support a means for assigning a second priority to a second message based on a second prioritization rule, where the second message is scheduled on overlapping resources with the first sidelink feedback channel message. The communications manager 1020 may be configured as or otherwise support a means for communicating on the overlapping resources based on a comparison of the first priority of the first sidelink feedback channel message and the second priority of the second message.

Additionally, or alternatively, the communications manager 1020 may support wireless communication at a first UE in accordance with examples as disclosed herein. For example, the communications manager 1020 may be configured as or otherwise support a means for generating a sidelink feedback channel message to transmit to a second UE, the sidelink feedback channel message including one or more feedback indications. The communications manager 1020 may be configured as or otherwise support a means for avoiding including one or more collision indications for transmission to the second UE in the sidelink feedback channel message. The communications manager 1020 may be configured as or otherwise support a means for determining a priority of the sidelink feedback channel message based on one or more priorities of the one or more feedback indications. The communications manager 1020 may be configured as or otherwise support a means for transmitting the sidelink feedback channel message based on the priority of the sidelink feedback channel message.

By including or configuring the communications manager 1020 in accordance with examples as described herein, the device 1005 may support techniques for reduced processing, reduced power consumption, and more efficient utilization of communication resources. Because the device 1005 may be able to prioritize feedback messages including feedback indications and collision indications, the device 1005 may be able to efficiently determine which message to transmit or receive in a PSFCH. As a result, the device 1005 may utilize inter-UE coordination messages efficiently and avoid or minimize interference and collisions, resulting in power savings, processing savings, and efficient resource utilization.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of prioritization between feedback and collision indications as described herein, or the processor 1040 and the memory 1030 may be otherwise configured to perform or support such operations.

Figure 11:
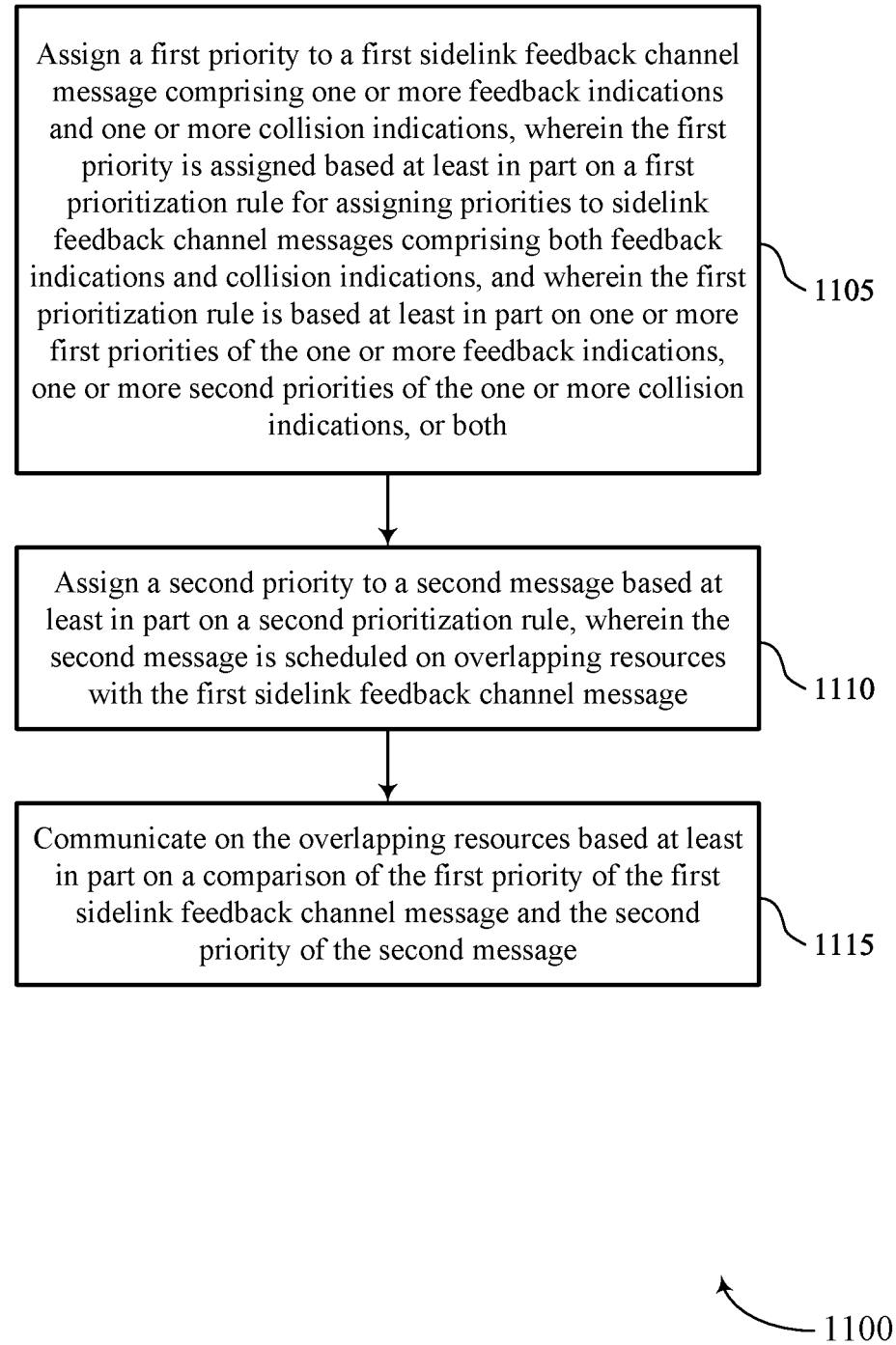
FIGS. 11 and 12 show flowcharts illustrating methods that support prioritization between feedback and collision indications in accordance with one or more aspects of the present disclosure.

FIG. 11 shows a flowchart illustrating a method 1100 that supports prioritization between feedback and collision indications in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include assigning a first priority to a first sidelink feedback channel message including one or more feedback indications and one or more collision indications, where the first priority is assigned based on a first prioritization rule for assigning priorities to sidelink feedback channel messages including both feedback indications and collision indications, and where the first prioritization rule is based on one or more first priorities of the one or more feedback indications, one or more second priorities of the one or more collision indications, or both. The operations of 1105 may be performed in accordance with examples as disclosed herein. In some examples, aspects of the operations of 1105 may be performed by a priority manager 925 as described with reference to FIG. 9.

At 1110, the method may include assigning a second priority to a second message based on a second prioritization rule, where the second message is scheduled on overlapping resources with the first sidelink feedback channel message. The operations of 1110 may be performed in accordance with examples as disclosed herein. In some examples, aspects of the operations of 1110 may be performed by a priority manager 925 as described with reference to FIG. 9.

At 1115, the method may include communicating on the overlapping resources based on a comparison of the first priority of the first sidelink feedback channel message and the second priority of the second message. The operations of 1115 may be performed in accordance with examples as disclosed herein. In some examples, aspects of the operations of 1115 may be performed by a feedback manager 930 as described with reference to FIG. 9.

Figure 12:
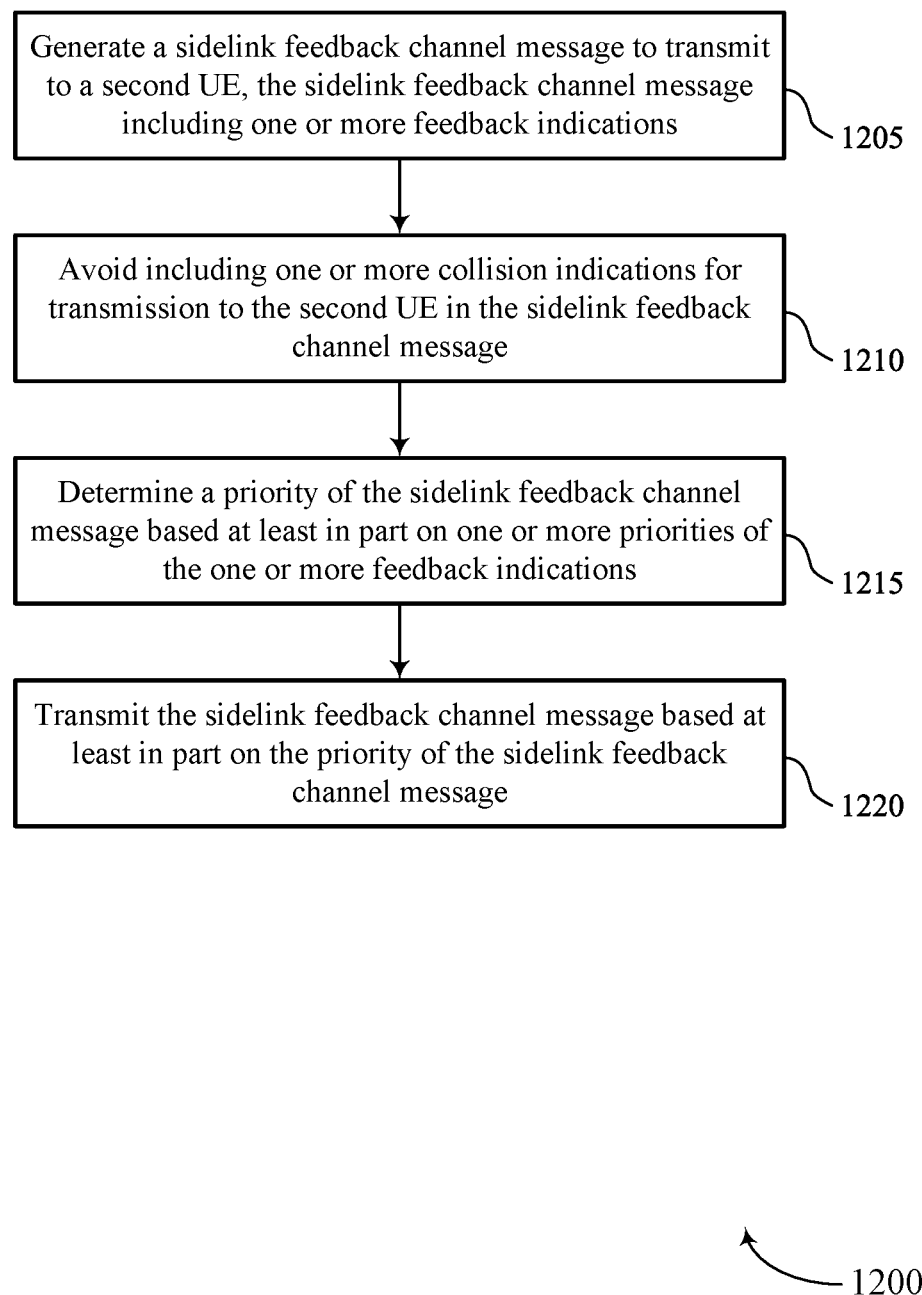

FIG. 12 shows a flowchart illustrating a method 1200 that supports prioritization between feedback and collision indications in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include generating a sidelink feedback channel message to transmit to a second UE, the sidelink feedback channel message including one or more feedback indications. The operations of 1205 may be performed in accordance with examples as disclosed herein. In some examples, aspects of the operations of 1205 may be performed by a feedback manager 930 as described with reference to FIG. 9.

At 1210, the method may include avoiding including one or more collision indications for transmission to the second UE in the sidelink feedback channel message. The operations of 1210 may be performed in accordance with examples as disclosed herein. In some examples, aspects of the operations of 1210 may be performed by a collision indication manager 935 as described with reference to FIG. 9.

At 1215, the method may include determining a priority of the sidelink feedback channel message based on one or more priorities of the one or more feedback indications. The operations of 1215 may be performed in accordance with examples as disclosed herein. In some examples, aspects of the operations of 1215 may be performed by a priority manager 925 as described with reference to FIG. 9.

At 1220, the method may include transmitting the sidelink feedback channel message based on the priority of the sidelink feedback channel message. The operations of 1220 may be performed in accordance with examples as disclosed herein. In some examples, aspects of the operations of 1220 may be performed by a feedback manager 930 as described with reference to FIG. 9.

The following provides an overview of aspects of the present disclosure:

Aspect 1: A method for wireless communication at a first UE, comprising: assigning a first priority to a first sidelink feedback channel message comprising one or more feedback indications and one or more collision indications, wherein the first priority is assigned based at least in part on a first prioritization rule for assigning priorities to sidelink feedback channel messages comprising both feedback indications and collision indications, and wherein the first prioritization rule is based at least in part on one or more first priorities of the one or more feedback indications, one or more second priorities of the one or more collision indications, or both; assigning a second priority to a second message based at least in part on a second prioritization rule, wherein the second message is scheduled on overlapping resources with the first sidelink feedback channel message; and communicating on the overlapping resources based at least in part on a comparison of the first priority of the first sidelink feedback channel message and the second priority of the second message.

Aspect 2: The method of aspect 1, wherein assigning the first priority of the first message comprises: determining, according to a first prioritization procedure, a highest priority of the one or more first priorities of the one or more feedback indications, wherein the highest priority of the one or more first priorities of the one or more feedback indications corresponds to the first priority of the first sidelink feedback channel message.

Aspect 3: The method of aspect 2, wherein the first prioritization rule indicates using the first prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

Aspect 4: The method of any of aspects 1 through 3, wherein assigning the first priority of the first message comprises: determining, according to a second prioritization procedure, a highest priority of the one or more first priorities of the one or more feedback indications and of the one or more second priorities of the one or more collision indications, wherein the highest priority of the one or more first priorities of the one or more feedback indications and of the one or more second priorities of the one or more collision indications corresponds to the first priority of the first sidelink feedback channel message.

Aspect 5: The method of aspect 4, wherein the first prioritization rule indicates using the second prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

Aspect 6: The method of any of aspects 1 through 5, wherein the first prioritization rule indicates using a first prioritization procedure for communication prioritization between sidelink feedback channel messages for transmission and reception, and the first prioritization rule indicates using a second prioritization procedure for communication prioritization between a sidelink feedback channel message associated with a first radio access technology and another message associated with a second radio access technology or between a sidelink feedback channel message and an uplink message.

Aspect 7: The method of aspect 6, wherein the first prioritization procedure indicates using a highest priority of the one or more first priorities of the one or more feedback indications as the first priority, and the second prioritization procedure indicates using a highest priority of the one or more first priorities of the one or more feedback indications and of the one or more second priorities of the one or more collision indications as the first priority.

Aspect 8: The method of any of aspects 1 through 7, wherein communicating on the overlapping resources comprises: transmitting or receiving the first sidelink feedback channel message when the first priority of the first sidelink feedback channel message is higher than the second priority of the second message.

Aspect 9: The method of any of aspects 1 through 8, wherein communicating on the overlapping resources comprises: transmitting or receiving the second message when the second priority of the second message is higher than the first priority of the first sidelink feedback channel message.

Aspect 10: The method of any of aspects 1 through 9, further comprising: receiving sidelink data from a second UE; and generating the first sidelink feedback channel message including the one or more feedback indications for transmission to the second UE based at least in part on receiving the sidelink data from the second UE, wherein the one or more feedback indications comprise hybrid automatic repeat request feedback for the sidelink data.

Aspect 11: The method of any of aspects 1 through 10, further comprising: transmitting sidelink data to a second UE; and determining that the first sidelink feedback channel message includes the one or more feedback indications for reception by the first UE based at least in part on transmitting the sidelink data to the second UE, wherein the one or more feedback indications comprise hybrid automatic repeat request feedback for the sidelink data.

Aspect 12: The method of any of aspects 1 through 11, further comprising: receiving sidelink control information from a second UE reserving resources for sidelink communications, wherein the resources reserved by the second UE at least partially overlaps with resources reserved by a third UE; generating the first sidelink feedback channel message including the one or more collision indications for transmission to the second UE based at least in part on receiving the sidelink control information from the second UE, wherein each of the one or more collision indications indicates that the resources reserved by the second UE at least partially overlaps with the resources reserved by the third UE.

Aspect 13: The method of any of aspects 1 through 12, further comprising: transmitting sidelink control information reserving resources for sidelink communications; determining that the first sidelink feedback channel message includes the one or more collision indications for reception by the first UE based at least in part on transmitting the sidelink control information, wherein each of the one or more collision indications indicates that the resources reserved by the first UE at least partially overlaps with the resources reserved by a second UE.

Aspect 14: A method for wireless communication at a first UE, comprising: generating a sidelink feedback channel message to transmit to a second UE, the sidelink feedback channel message including one or more feedback indications; avoiding including one or more collision indications for transmission to the second UE in the sidelink feedback channel message; determining a priority of the sidelink feedback channel message based at least in part on one or more priorities of the one or more feedback indications; and transmitting the sidelink feedback channel message based at least in part on the priority of the sidelink feedback channel message.

Aspect 15: The method of aspect 14, further comprising: receiving sidelink data from the second UE; and generating the sidelink feedback channel message including the one or more feedback indications for transmission to the second UE based at least in part on receiving the sidelink data from the second UE, wherein the one or more feedback indications comprise hybrid automatic repeat request feedback for the sidelink data.

Aspect 16: The method of any of aspects 14 through 15, further comprising: receiving sidelink control information from a second UE reserving resources for sidelink communications, wherein each of the one or more collision indications indicates that the resources reserved by the second UE at least partially overlaps with the resources reserved by a third UE.

Aspect 17: An apparatus for wireless communication at a first UE, comprising a processor; memory coupled with the processor; and instructions stored in the memory and executable by the processor to cause the apparatus to perform a method of any of aspects 1 through 13.

Aspect 18: An apparatus for wireless communication at a first UE, comprising at least one means for performing a method of any of aspects 1 through 13.

Aspect 19: A non-transitory computer-readable medium storing code for wireless communication at a first UE, the code comprising instructions executable by a processor to perform a method of any of aspects 1 through 13.

Aspect 20: An apparatus for wireless communication at a first UE, comprising a processor; memory coupled with the processor; and instructions stored in the memory and executable by the processor to cause the apparatus to perform a method of any of aspects 14 through 16.

Aspect 21: An apparatus for wireless communication at a first UE, comprising at least one means for performing a method of any of aspects 14 through 16.

Aspect 22: A non-transitory computer-readable medium storing code for wireless communication at a first UE, the code comprising instructions executable by a processor to perform a method of any of aspects 14 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   one or more processors;
   memory coupled with the one or more processors; and
   instructions stored in the memory and executable by the one or more processors to cause the apparatus to:
      assign a first priority to a first sidelink feedback channel message comprising one or more feedback indications and one or more collision indications, wherein the first priority is assigned based at least in part on a first prioritization rule for assigning priorities to sidelink feedback channel messages comprising both feedback indications and collision indications, and wherein the first prioritization rule is based at least in part on one or more first priorities of the one or more feedback indications, one or more second priorities of the one or more collision indications, or both;
      assign a second priority to a second message based at least in part on a second prioritization rule, wherein the second message is scheduled on overlapping resources with the first sidelink feedback channel message; and
      communicate on the overlapping resources based at least in part on a comparison of the first priority of the first sidelink feedback channel message and the second priority of the second message.

2. The apparatus of claim 1, wherein the instructions to assign the first priority of the first sidelink feedback channel message are executable by the one or more processors to cause the apparatus to:
   determine, according to a first prioritization procedure, a highest priority of the one or more first priorities of the one or more feedback indications, wherein the highest priority of the one or more first priorities of the one or more feedback indications corresponds to the first priority of the first sidelink feedback channel message.

3. The apparatus of claim 2, wherein the first prioritization rule indicates using the first prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

4. The apparatus of claim 1, wherein the instructions to assign the first priority of the first sidelink feedback channel message are executable by the one or more processors to cause the apparatus to:
determine, according to a second prioritization procedure, a highest priority of the one or more first priorities of the one or more feedback indications and of the one or more second priorities of the one or more collision indications, wherein the highest priority of the one or more first priorities of the one or more feedback indications and of the one or more second priorities of the one or more collision indications corresponds to the first priority of the first sidelink feedback channel message.

5. The apparatus of claim 4, wherein the first prioritization rule indicates using the second prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

6. The apparatus of claim 1, wherein the first prioritization rule indicates using a first prioritization procedure for communication prioritization between sidelink feedback channel messages for transmission and reception, and the first prioritization rule indicates using a second prioritization procedure for communication prioritization between a sidelink feedback channel message associated with a first radio access technology and another message associated with a second radio access technology or between a sidelink feedback channel message and an uplink message.

7. The apparatus of claim 6, wherein the first prioritization procedure indicates using a highest priority of the one or more first priorities of the one or more feedback indications as the first priority, and the second prioritization procedure indicates using a highest priority of the one or more first priorities of the one or more feedback indications and of the one or more second priorities of the one or more collision indications as the first priority.

8. The apparatus of claim 1, wherein the instructions to communicate on the overlapping resources are executable by the one or more processors to cause the apparatus to:
transmit or receive the first sidelink feedback channel message when the first priority of the first sidelink feedback channel message is higher than the second priority of the second message.

9. The apparatus of claim 1, wherein the instructions to communicate on the overlapping resources are executable by the one or more processors to cause the apparatus to:
transmit or receive the second message when the second priority of the second message is higher than the first priority of the first sidelink feedback channel message.

10. The apparatus of claim 1, wherein the instructions are further executable by the one or more processors to cause the apparatus to:
receive sidelink data from a second UE; and
generate the first sidelink feedback channel message including the one or more feedback indications for transmission to the second UE based at least in part on receiving the sidelink data from the second UE, wherein the one or more feedback indications comprise hybrid automatic repeat request feedback for the sidelink data.

11. The apparatus of claim 1, wherein the instructions are further executable by the one or more processors to cause the apparatus to:
transmit sidelink data to a second UE; and
determine that the first sidelink feedback channel message includes the one or more feedback indications for reception by the first UE based at least in part on transmitting the sidelink data to the second UE, wherein the one or more feedback indications comprise hybrid automatic repeat request feedback for the sidelink data.

12. The apparatus of claim 1, wherein the instructions are further executable by the one or more processors to cause the apparatus to:
receive sidelink control information from a second UE reserving resources for sidelink communications, wherein the resources reserved by the second UE at least partially overlaps with resources reserved by a third UE; and
generate the first sidelink feedback channel message including the one or more collision indications for transmission to the second UE based at least in part on receiving the sidelink control information from the second UE, wherein each of the one or more collision indications indicates that the resources reserved by the second UE at least partially overlaps with the resources reserved by the third UE.

13. The apparatus of claim 1, wherein the instructions are further executable by the one or more processors to cause the apparatus to:
transmit sidelink control information reserving resources for sidelink communications; and
determine that the first sidelink feedback channel message includes the one or more collision indications for reception by the first UE based at least in part on transmitting the sidelink control information, wherein each of the one or more collision indications indicates that the resources reserved by the first UE at least partially overlaps with the resources reserved by a second UE.

14. A method for wireless communication at a first user equipment (UE), comprising:
assigning a first priority to a first sidelink feedback channel message comprising one or more feedback indications and one or more collision indications, wherein the first priority is assigned based at least in part on a first prioritization rule for assigning priorities to sidelink feedback channel messages comprising both feedback indications and collision indications, and wherein the first prioritization rule is based at least in part on one or more first priorities of the one or more feedback indications, one or more second priorities of the one or more collision indications, or both;
assigning a second priority to a second message based at least in part on a second prioritization rule, wherein the second message is scheduled on overlapping resources with the first sidelink feedback channel message; and
communicating on the overlapping resources based at least in part on a comparison of the first priority of the first sidelink feedback channel message and the second priority of the second message.

15. The method of claim 14, wherein assigning the first priority of the first sidelink feedback channel message comprises:

determining, according to a first prioritization procedure, a highest priority of the one or more first priorities of the one or more feedback indications, wherein the highest priority of the one or more first priorities of the one or more feedback indications corresponds to the first priority of the first sidelink feedback channel message.

16. The method of claim 15, wherein the first prioritization rule indicates using the first prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

17. The method of claim 14, wherein assigning the first priority of the first sidelink feedback channel message comprises:
determining, according to a second prioritization procedure, a highest priority of the one or more first priorities of the one or more feedback indications and of the one or more second priorities of the one or more collision indications, wherein the highest priority of the one or more first priorities of the one or more feedback indications and of the one or more second priorities of the one or more collision indications corresponds to the first priority of the first sidelink feedback channel message.

18. The method of claim 17, wherein the first prioritization rule indicates using the second prioritization procedure for communication prioritization between sidelink feedback channel messages for transmission and reception, between a sidelink feedback channel message associated with a first radio access technology and another message associated with a second radio access technology, and between a sidelink feedback channel message and an uplink message.

19. The method of claim 14, wherein the first prioritization rule indicates using a first prioritization procedure for communication prioritization between sidelink feedback channel messages for transmission and reception, and the first prioritization rule indicates using a second prioritization procedure for communication prioritization between a sidelink feedback channel message associated with a first radio access technology and another message associated with a second radio access technology or between a sidelink feedback channel message and an uplink message.

20. The method of claim 19, wherein the first prioritization procedure indicates using a highest priority of the one or more first priorities of the one or more feedback indications as the first priority, and the second prioritization procedure indicates using a highest priority of the one or more first priorities of the one or more feedback indications and of the one or more second priorities of the one or more collision indications as the first priority.

21. The method of claim 14, wherein communicating on the overlapping resources comprises:
transmitting or receiving the first sidelink feedback channel message when the first priority of the first sidelink feedback channel message is higher than the second priority of the second message.

22. The method of claim 14, wherein communicating on the overlapping resources comprises:
transmitting or receiving the second message when the second priority of the second message is higher than the first priority of the first sidelink feedback channel message.

23. The method of claim 14, further comprising:
receiving sidelink data from a second UE; and
generating the first sidelink feedback channel message including the one or more feedback indications for transmission to the second UE based at least in part on receiving the sidelink data from the second UE, wherein the one or more feedback indications comprise hybrid automatic repeat request feedback for the sidelink data.

24. The method of claim 14, further comprising:
transmitting sidelink data to a second UE; and
determining that the first sidelink feedback channel message includes the one or more feedback indications for reception by the first UE based at least in part on transmitting the sidelink data to the second UE, wherein the one or more feedback indications comprise hybrid automatic repeat request feedback for the sidelink data.

25. The method of claim 14, further comprising:
receiving sidelink control information from a second UE reserving resources for sidelink communications, wherein the resources reserved by the second UE at least partially overlaps with resources reserved by a third UE; and
generating the first sidelink feedback channel message including the one or more collision indications for transmission to the second UE based at least in part on receiving the sidelink control information from the second UE, wherein each of the one or more collision indications indicates that the resources reserved by the second UE at least partially overlaps with the resources reserved by the third UE.

26. The method of claim 14, further comprising:
transmitting sidelink control information reserving resources for sidelink communications; and
determining that the first sidelink feedback channel message includes the one or more collision indications for reception by the first UE based at least in part on transmitting the sidelink control information, wherein each of the one or more collision indications indicates that the resources reserved by the first UE at least partially overlaps with the resources reserved by a second UE.

27. A non-transitory computer-readable medium storing code for wireless communications at a first user equipment (UE), the code comprising instructions executable by one or more processors to:
assign a first priority to a first sidelink feedback channel message comprising one or more feedback indications and one or more collision indications, wherein the first priority is assigned based at least in part on a first prioritization rule for assigning priorities to sidelink feedback channel messages comprising both feedback indications and collision indications, and wherein the first prioritization rule is based at least in part on one or more first priorities of the one or more feedback indications, one or more second priorities of the one or more collision indications, or both;
assign a second priority to a second message based at least in part on a second prioritization rule, wherein the second message is scheduled on overlapping resources with the first sidelink feedback channel message; and
communicate on the overlapping resources based at least in part on a comparison of the first priority of the first sidelink feedback channel message and the second priority of the second message.

28. The non-transitory computer-readable medium of claim 27, wherein, to assign the priority of the first sidelink feedback channel message, the one or more processors are individually or collectively further operable to execute the code to cause the first UE to:
  determine, according to a first prioritization procedure, a highest priority of the one or more first priorities of the one or more feedback indications, wherein the highest priority of the one or more first priorities of the one or more feedback indications corresponds to the first priority of the first sidelink feedback channel message.

29. The non-transitory computer-readable medium of claim 27, wherein, to assign the priority of the first sidelink feedback channel message, the one or more processors are individually or collectively further operable to execute the code to cause the first UE to:
  determine, according to a second prioritization procedure, a highest priority of the one or more first priorities of the one or more feedback indications and of the one or more second priorities of the one or more collision indications, wherein the highest priority of the one or more first priorities of the one or more feedback indications and of the one or more second priorities of the one or more collision indications corresponds to the first priority of the first sidelink feedback channel message.

30. An apparatus for wireless communication at a first user equipment (UE), comprising:
  means for assigning a first priority to a first sidelink feedback channel message comprising one or more feedback indications and one or more collision indications, wherein the first priority is assigned based at least in part on a first prioritization rule for assigning priorities to sidelink feedback channel messages comprising both feedback indications and collision indications, and wherein the first prioritization rule is based at least in part on one or more first priorities of the one or more feedback indications, one or more second priorities of the one or more collision indications, or both;
  means for assigning a second priority to a second message based at least in part on a second prioritization rule, wherein the second message is scheduled on overlapping resources with the first sidelink feedback channel message; and
  means for communicating on the overlapping resources based at least in part on a comparison of the first priority of the first sidelink feedback channel message and the second priority of the second message.

* * * * *